(12) United States Patent
Harada et al.

(10) Patent No.: US 11,029,269 B2
(45) Date of Patent: Jun. 8, 2021

(54) MONITORING DEVICE

(71) Applicant: DENSO CORPORATION, Kariya (JP)

(72) Inventors: Toshikazu Harada, Kariya (JP); Atusi Sakaida, Kariya (JP); Toshihisa Taniguchi, Kariya (JP); Norio Gouko, Kariya (JP); Keiji Okamoto, Kariya (JP); Keita Saitou, Kariya (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 16/092,171

(22) PCT Filed: Apr. 7, 2017

(86) PCT No.: PCT/JP2017/014449
§ 371 (c)(1),
(2) Date: Oct. 8, 2018

(87) PCT Pub. No.: WO2017/175851
PCT Pub. Date: Oct. 12, 2017

(65) Prior Publication Data
US 2019/0162684 A1 May 30, 2019

(30) Foreign Application Priority Data
Apr. 8, 2016 (JP) .............................. JP2016-078341

(51) Int. Cl.
*G01K 17/00* (2006.01)
*G01N 25/18* (2006.01)
(Continued)

(52) U.S. Cl.
CPC .............. *G01N 25/18* (2013.01); *G01K 3/04* (2013.01); *G01K 17/00* (2013.01); *G01L 1/005* (2013.01); *G01K 17/08* (2013.01)

(58) Field of Classification Search
CPC ........ G01N 25/20; G01N 25/00; G01K 17/00; G01K 17/08; G01K 1/16; G01K 7/04;
(Continued)

(56) References Cited

U.S. PATENT DOCUMENTS 4,541,728 A * 9/1985 Hauser ................... G01N 25/18
374/29
4,553,852 A * 11/1985 Derderian .............. G01N 25/18
374/1

(Continued)

FOREIGN PATENT DOCUMENTS

EP 0553849 A1 8/1993
EP 3358333 A1 8/2018
(Continued)

*Primary Examiner* — Gail Kaplan Verbitsky
(74) *Attorney, Agent, or Firm* — Harness, Dickey & Pierce, P.L.C.

(57) ABSTRACT

A support device comprises a piston rod and a fixed member arranged so that a target object is placed therebetween, and an elastic member is provided to the target object side of the fixed member. A monitoring device includes a heat flux sensor and a detection part. When the target object is supported between the piston rod and the fixed member due to force applied by the piston rod, the heat flux sensor outputs a signal corresponding to the heat flux flowing between the elastic member, which is compressed by the load applied from the piston rod, and the fixed member. Based on the signal output by the heat flux sensor, the detection part detects the support state of the target object supported by the support device, or the size of the target object.

5 Claims, 18 Drawing Sheets

(51) Int. Cl.
*G01L 1/00* (2006.01)
*G01K 3/04* (2006.01)
*G01K 17/08* (2006.01)

(58) Field of Classification Search
CPC ......... G01K 1/14; G01K 7/06; G01M 99/002; G01D 11/30
See application file for complete search history.

(56) References Cited

U.S. PATENT DOCUMENTS

| | | | | |
|---|---|---|---|---|
| 4,577,976 A | * | 3/1986 | Hayashi | ................. G01N 25/18 374/29 |
| 6,019,506 A | * | 2/2000 | Senda | ................ B23Q 11/0003 374/55 |
| 9,523,926 B2 | * | 12/2016 | Umemura | ................ G03F 7/707 |
| 10,338,098 B2 | * | 7/2019 | Sadeghian Marnani | .................... G01N 25/18 |
| 2005/0087919 A1 | | 4/2005 | Arai et al. | |
| 2009/0051911 A1 | * | 2/2009 | Jung | ..................... H01L 21/681 356/244 |
| 2014/0355643 A1 | * | 12/2014 | Sharratt | ................. G01K 17/00 374/1 |
| 2016/0116346 A1 | * | 4/2016 | Aliane | ..................... G01K 1/16 374/185 |
| 2016/0121847 A1 | | 5/2016 | Saitou et al. | |
| 2017/0320463 A1 | | 11/2017 | Saitou et al. | |
| 2018/0313725 A1 | * | 11/2018 | Harada | ................. G01M 13/00 |
| 2019/0195817 A1 | * | 6/2019 | Gouko | ................... G01N 25/16 |
| 2019/0312239 A1 | * | 10/2019 | Hartl | ..................... H01M 2/065 |

FOREIGN PATENT DOCUMENTS

| | | | | |
|---|---|---|---|---|
| FR | 3006438 A1 | * | 12/2014 | ............. B29C 35/00 |
| JP | 2004142058 A | | 5/2004 | |
| JP | 5376086 B1 | | 12/2013 | |
| JP | 2015158400 A | | 9/2015 | |
| JP | 2017067761 A | | 4/2017 | |
| WO | WO-2014/196383 A1 | | 12/2014 | |

* cited by examiner

FIG.4
(A)
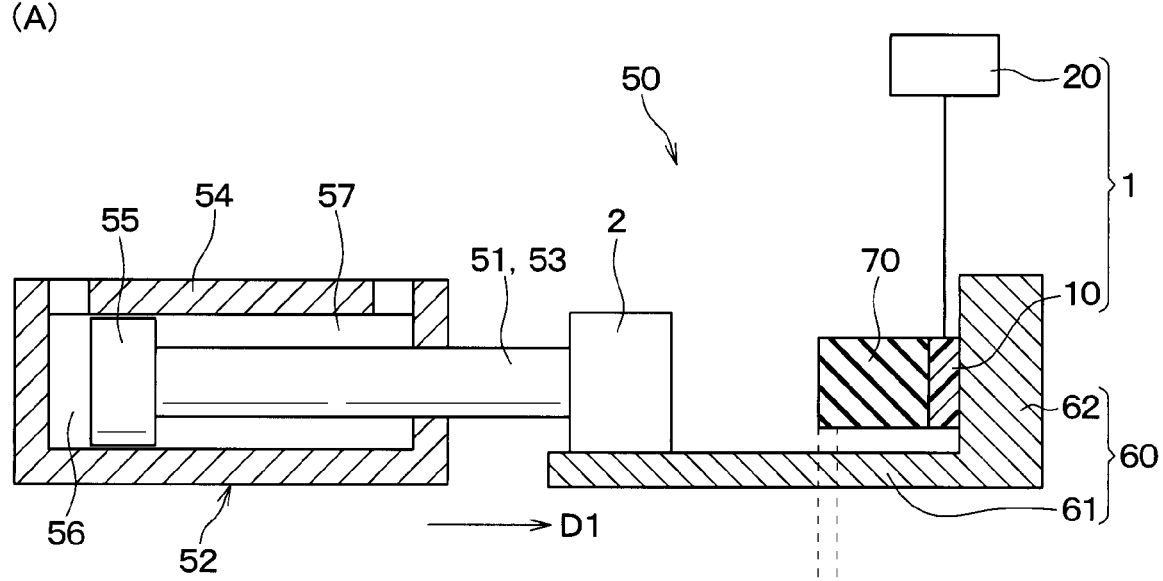
(B)
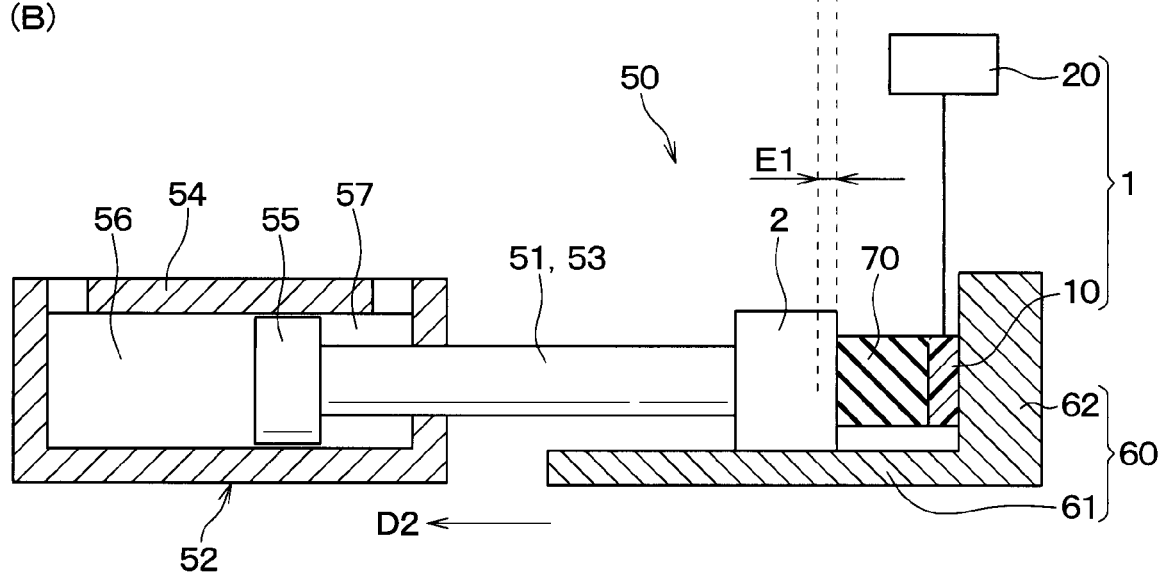

FIG.6
(A)
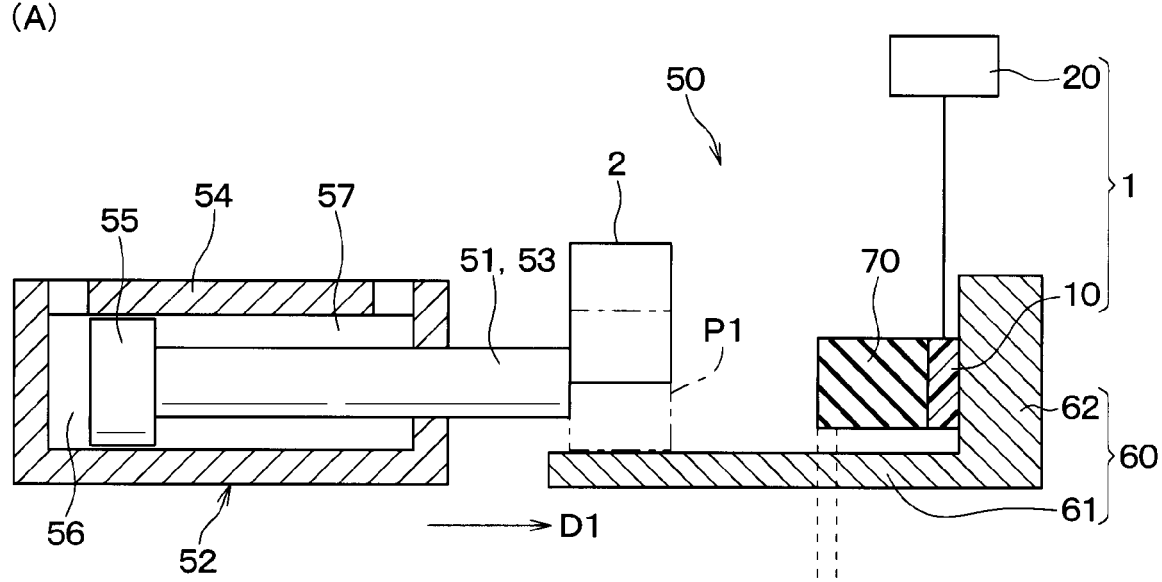
(B)
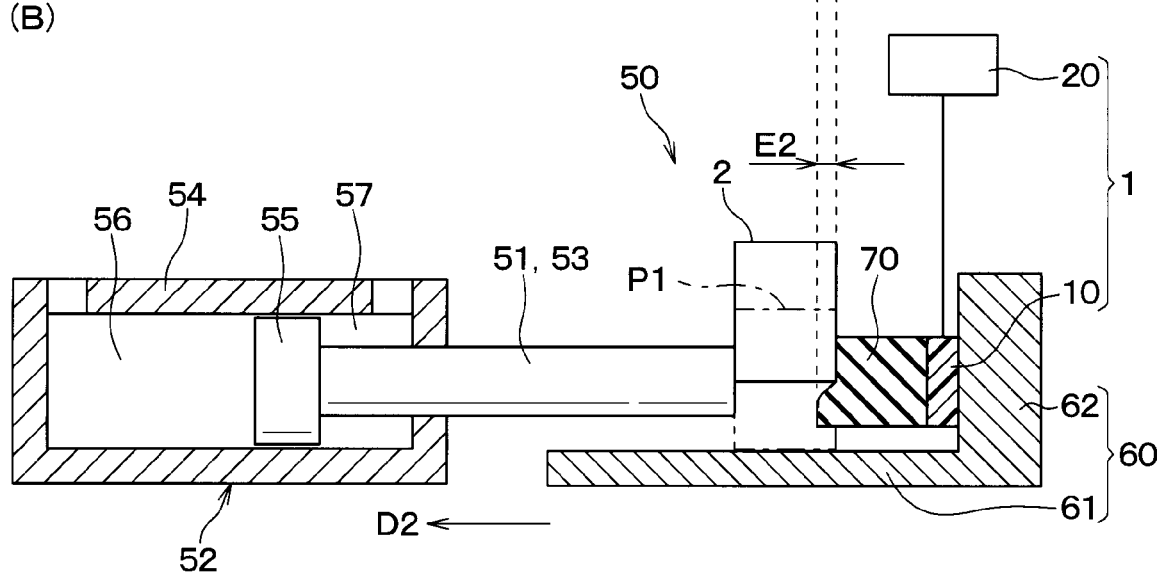

FIG.8
(A)
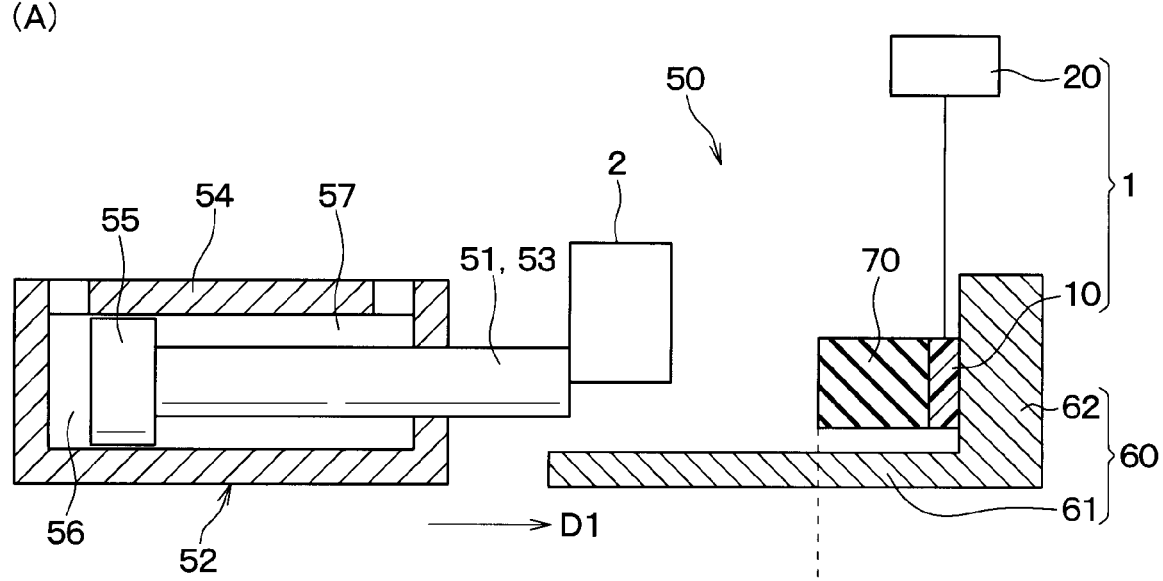
(B)
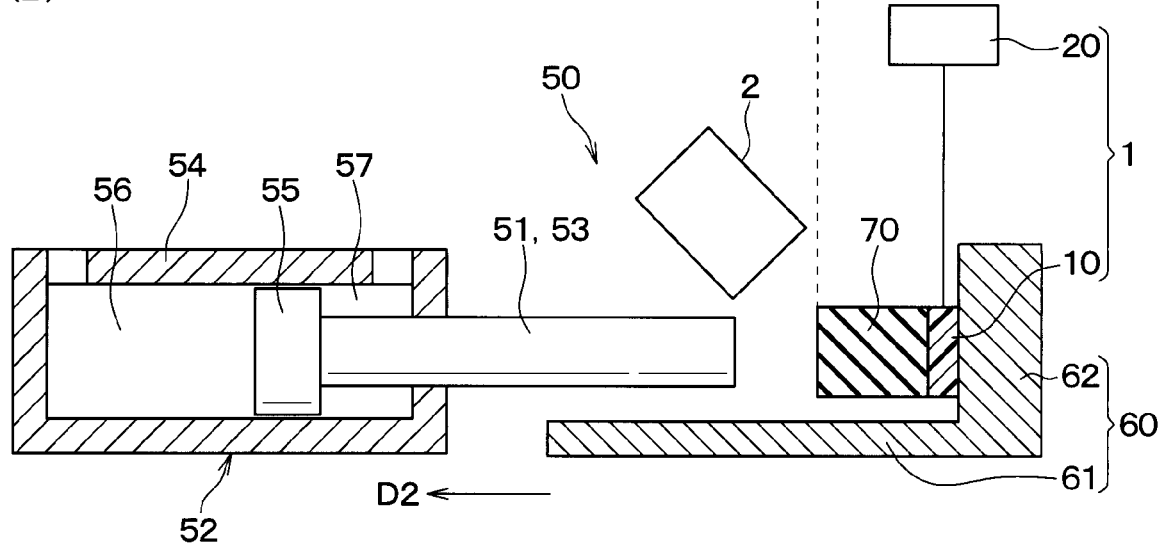

FIG.10
(A)
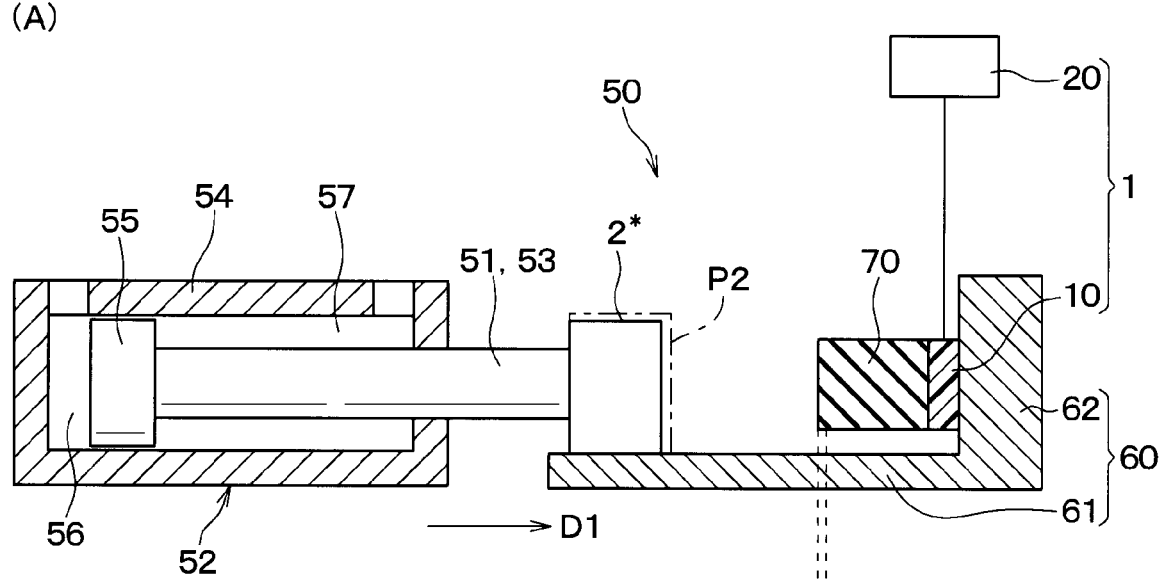
(B)
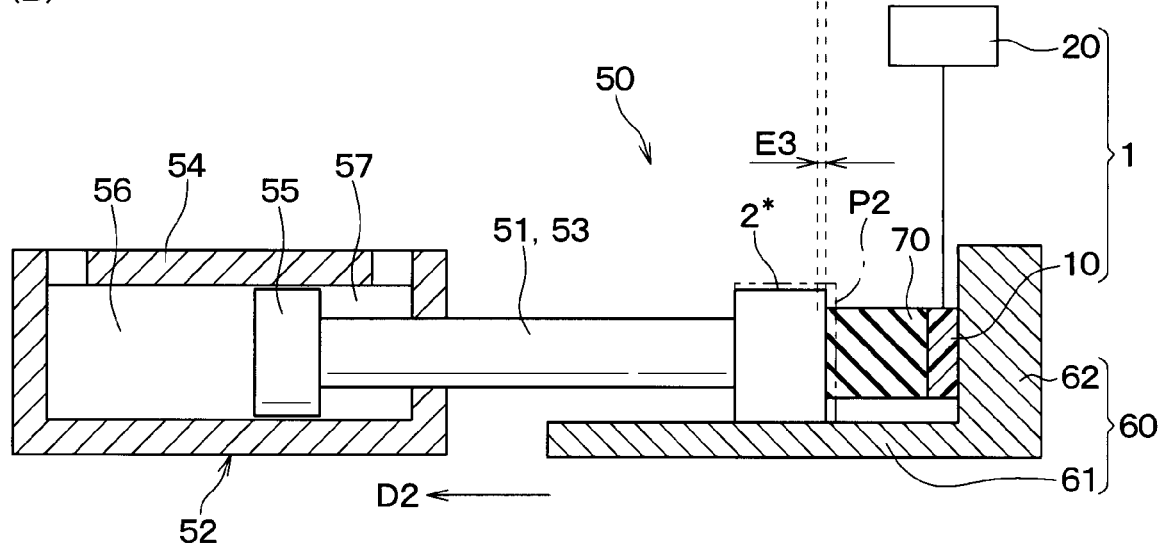

FIG.12
(A)
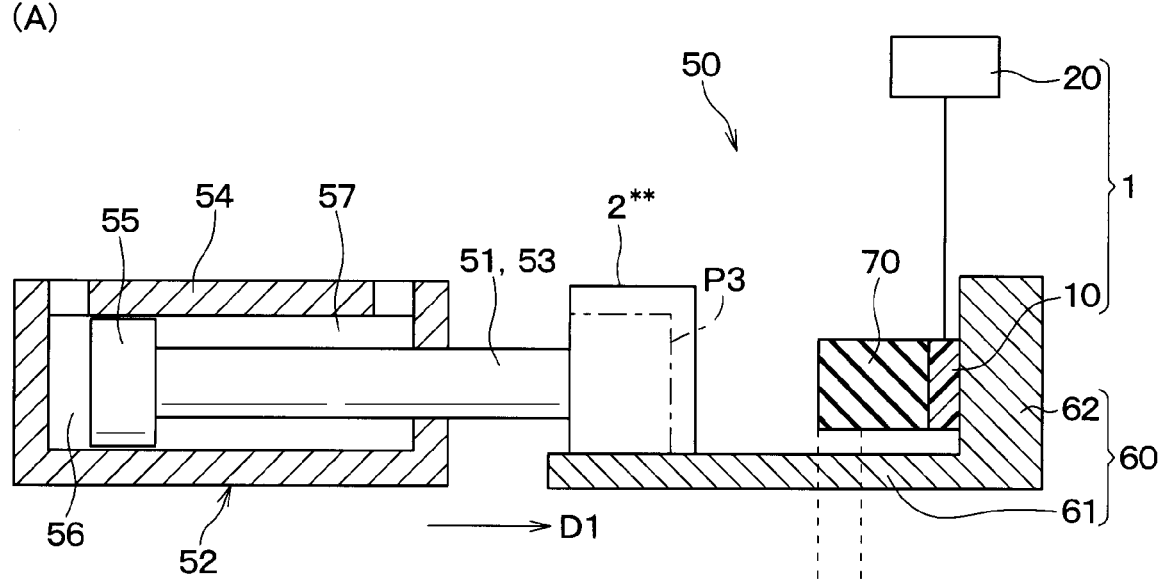
(B)
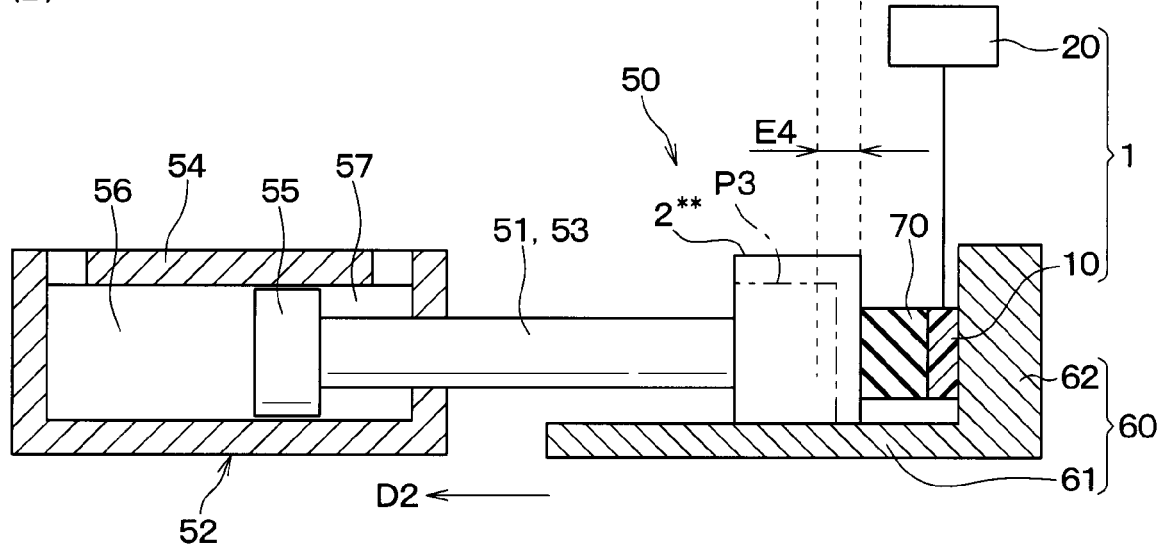

MONITORING DEVICE

CROSS REFERENCE TO RELATED APPLICATIONS

This application is a U.S. National Phase Application under 35 U.S.C. 371 of International Application No. PCT/JP2017/014449 filed on Apr. 7, 2017. This application is based on and claims the benefit of priority from Japanese Patent Application No. 2016-078341 filed on Apr. 8, 2016. The entire disclosures of all of the above applications are incorporated herein by reference.

TECHNICAL FIELD

The present disclosure relates to a technique for monitoring a support state of a target object supported by a support device.

BACKGROUND ART

For example, PTL 1 discloses a heat flux sensor that outputs a signal corresponding to heat flux.

CITATION LIST

Patent Literature

[PTL 1] JP 5376086 B

SUMMARY

A known support device supports an object by a plurality of support members arranged so that the object is placed between the support members. This support device is used, for example, to support an object at a predetermined position to cut or otherwise process the object. If the position at which the object is supported is deviated from the correct position, the cutting of the object will result in a processing failure. In addition, when the object is detached from the supporting members, the object cannot be cut. Generally, the presence or absence of a processing failure is determined by an inspection step after processing the object. Thus, if there is an error in the supporting of the object by the support device, a large number of defective products may be produced before a defective product is found by the inspection step. Therefore, it is desired to realize a monitoring device capable of monitoring the support state of the target object supported by the support device.

In order to realize such a monitoring device, for example, it is conceivable to attach a load cell to the supporting members of the support device. However, the load cell has problems as follows. The load cell detects the load based on deformation of a strain gauge. Therefore, the load cell may be damaged if a large load is applied from the support members to the strain gauge. In addition, since the load cell generally has a large plate thickness, there is a concern that the size of the support device increases. As described above, the method of monitoring the support state of the target object supported by the support device with the load cell has various problems such as the strength, size, and cost of the load cell.

Note that the problems to be solved related to the monitoring device described above are not limited to the case of monitoring a support device used for cutting an object. The above-described problems to be solved applies also to, for example, the case of monitoring a support device used to convey an object.

The present disclosure aims to provide a technique for monitoring a support state of a target object supported by a support device.

Solution to Problem

A monitoring device which is one mode of the technique of the present disclosure monitors the support state of the target object (2) supported by the support device (50). The support device comprises a plurality of support members (51, 60) arranged so that the target object is placed between the support members, and an elastic member (70) is provided to at least one of the support members.

The monitoring device includes a heat flux sensor (10) and a detection part (20). When the target object is supported between the support members by movement of at least one of the support members, the elastic member is elastically deformed by the load applied from the support member. The heat flux sensor outputs a signal corresponding to the heat flux flowing between the elastic member and the outside. Based on the signal output by the heat flux sensor, the detection part detects the support state of the target object supported by the support members, or the size of the target object.

The elastic member generates heat or absorbs heat when it is deformed elastically. Thus, the monitoring device having the above configuration detects the heat flux flowing between the elastic member and the outside (open air) with the heat flux sensor. As a result, the monitoring device can determine whether or not the target object is being supported at the correct position by the support members. Alternatively, the monitoring device can detect the size of the target object.

The heat flux sensor has sufficient rigidity against the load applied in its thickness direction from the support member. In addition, the heat flux sensor has a small thickness. Therefore, the support device is not increased in size.

It is to be noted that the reference numbers in parentheses of the above elements merely indicate an example of the correspondence of the above elements with the specific elements described with respect to the embodiment described below.

BRIEF DESCRIPTION OF THE DRAWINGS

FIG. 4 is an explanatory view illustrating the operation of the support device, to which the monitoring device is attached, when the target object is supported at the correct position according to the first embodiment.

FIG. 6 is an explanatory view illustrating the operation of the support device, to which the monitoring device is attached, when the target object is supported at a position deviated from the correct position according to the first embodiment.

FIG. 8 is an explanatory view illustrating the operation of the support device, to which the monitoring device is attached, when the target object falls according to the first embodiment.

FIG. 10 is an explanatory view illustrating the operation of the support device, to which the monitoring device is attached, when a target object with a size that is smaller than the permitted size is supported according to the first embodiment.

FIG. 12 is an explanatory view illustrating the operation of the support device, to which the monitoring device is attached, when a target object with a size that is larger than the permitted size is supported according to the first embodiment.

DESCRIPTION OF THE EMBODIMENTS

An embodiment of a monitoring device which is one aspect of the technique of the present disclosure will be explained with reference to the drawings. The same or equivalent parts in the embodiments described below are assigned with the same reference number.

First Embodiment

Figure 1:
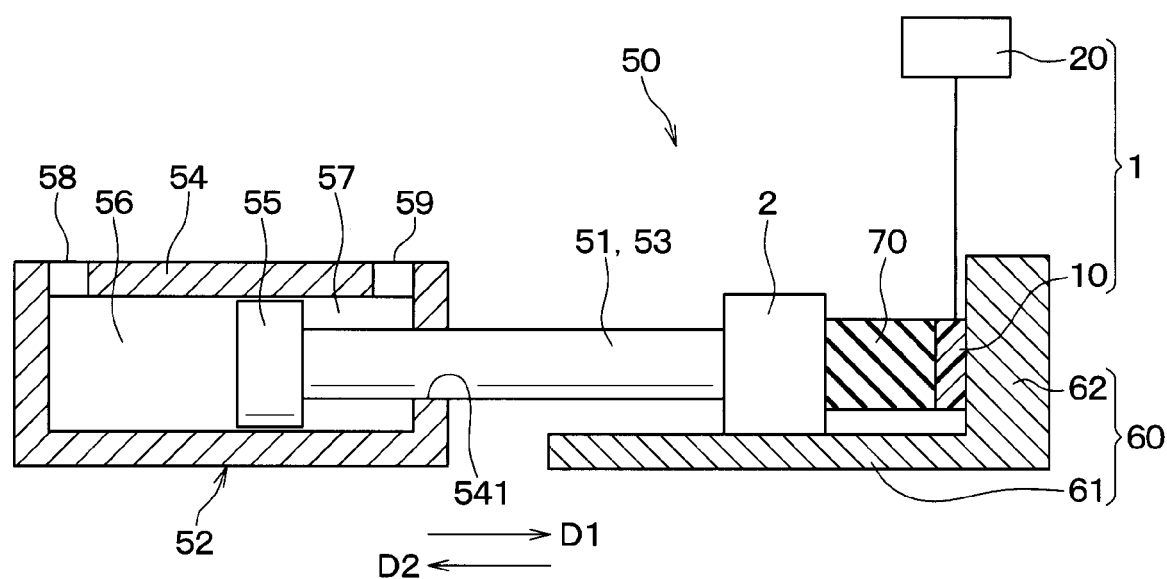
FIG. 1 is a cross-sectional view of the support device to which the monitoring device is attached, in a state where the target object is supported at the correct position, according to the first embodiment.

The present embodiment will be described with reference to the drawings. As shown in FIG. 1, a monitoring device 1 of this embodiment is attached to a support device 50. The monitoring device 1 monitors the support state of a target object 2 supported by the support device 50.

First, the support device 50 will be described.

The support device 50 includes a movable member 51, a fixed member 60, and an elastic member 70. The movable member 51 of the present embodiment is a piston rod 53 of an air cylinder 52. The piston rod 53 and the fixed member 60 are disposed so that the target object 2 is interposed between the piston rod 53 and the fixed member 60. The piston rod 53 as the movable member 51 and the fixed member 60 both correspond to an example of the "support member" recited in the claims.

The air cylinder 52 includes a cylinder 54, a piston 55, and the above-described piston rod 53. The air cylinder 52 causes the piston 55 and the piston rod 53 to reciprocate using air pressure as the driving force.

The cylinder 54 has a cylindrical shape. Inside the cylinder 54, there are two chambers 56, 57 (internal spaces).

The piston 55 is disposed inside the c chambers 56, 57 of the cylinder 54. The piston 55 can reciprocate in the axial direction of the cylinder 54 by using the pressure of the air supplied to the chambers 56, 57.

The piston rod 53 is a shaft member interlocked with the piston 55. One end of the piston rod 53 is connected to the piston 55, and the other end protrudes from a hole 541 provided at an axial end of the cylinder 54.

In the following description, the chamber on the side opposite to the piston rod 53 is referred to as a first chamber 56. The chamber on the side of the piston rod 53 is referred to as a second chamber 57.

A first opening 58 communicating with the first chamber 56 is formed in the cylinder 54. Further, a second opening 59 communicating with the second chamber 57 is formed in the cylinder 54. When compressed air is supplied through the first opening 58 to the first chamber 56, the second chamber 57 is opened to the atmosphere through the second opening 59. As a result, the piston 55 and the piston rod 53 move in the direction of the arrow D1.

In contrast, when compressed air is supplied through the second opening 59 to the second chamber 57, the first chamber 56 is opened to the atmosphere through the first opening 58. As a result, the piston 55 and the piston rod 53 move in the direction of the arrow D2. Thus, the piston 55 and the piston rod 53 can reciprocate in the axial direction of the cylinder 54 by using the pressure of the air supplied to the first chamber 56 or the second chamber 57.

The fixed member 60 is placed on the other side of the target object 2 with respect to the piston rod 53. The fixed member 60 has a mounting part 61 on which the object 2 is mounted and a fixed part 62 connected to the mounting part 61.

The elastic member 70 is provided on the target object 2 side of the fixed part 62. The elastic member 70 is formed of, for example, rubber or the like. The elastic member 70 functions as a stopper for regulating the movement of the target object 2.

As shown in FIG. 1, when the piston rod 53 moves in the direction of the arrow D1 and the target object 2 is sandwiched between the piston rod 53 and the elastic member 70, the target object 2 is supported by the piston rod 53 and the elastic member 70.

On the other hand, when the piston rod 53 moves in the direction of the arrow D2, the target object 2 is released from the supporting by the piston rod 53 and the elastic member 70.

Next, the monitoring device 1 for monitoring the support state of the target object 2 supported by the above-described support device 50 will be explained.

The monitoring device 1 includes a heat flux sensor 10 and a detection part 20.

The heat flux sensor 10 is provided between the fixed part 62 of the fixed member 60 and the elastic member 70. When the target object 2 is supported between the piston rod 53 and the elastic member 70 due to force applied by the piston rod 53, the elastic member 70 is compressed by the load applied from the piston rod 53 and the reaction force from the fixed part 62 and generates heat. At this time, the heat flux sensor 10 outputs a voltage signal corresponding to the heat flux flowing between the elastic member 70 and the outside (outside air) via the heat flux sensor 10.

Next, the structure of the heat flux sensor 10 will be described.

Figure 2:
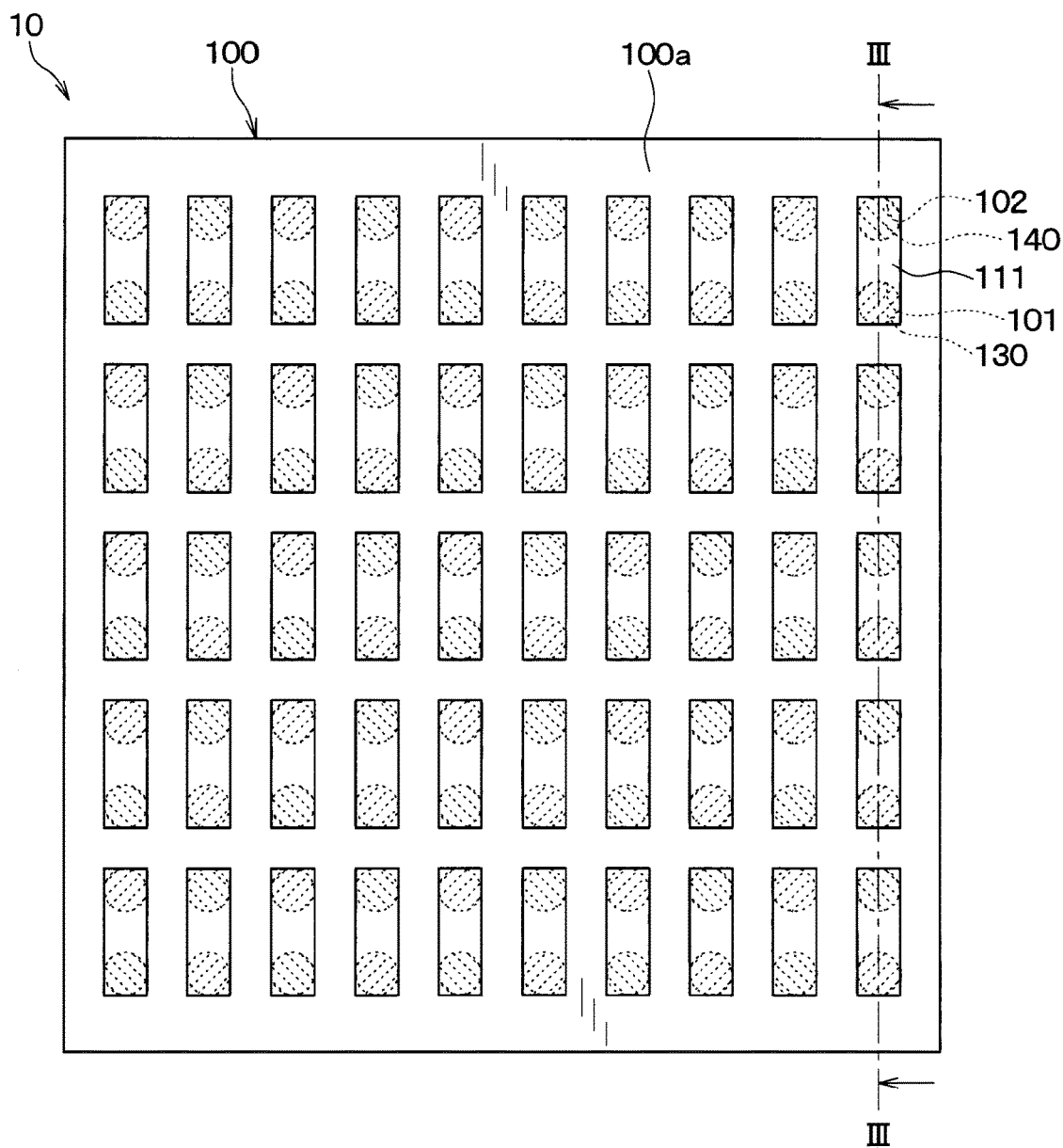
FIG. 2 is a plan view of the heat flux sensor shown in FIG. 1.
Figure 3:
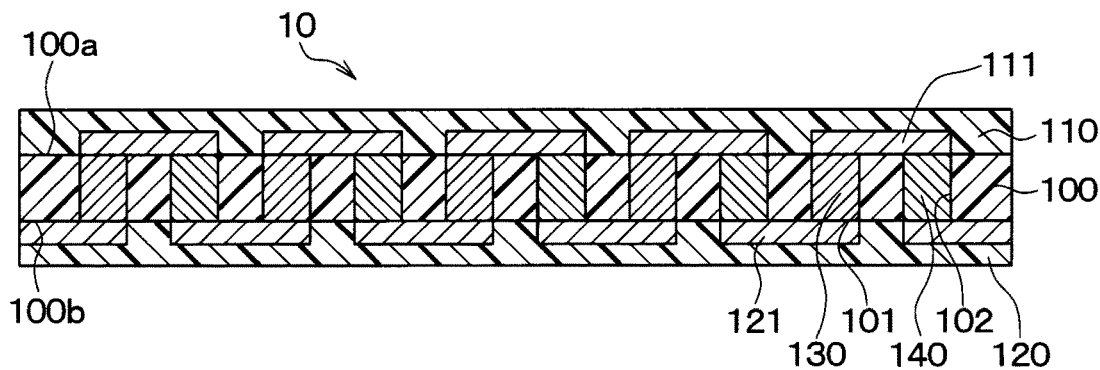
FIG. 3 is a cross-sectional view taken along line III-III shown in FIG. 2.

As illustrated in FIGS. 2 and 3, the heat flux sensor 10 has the following structure. The heat flux sensor 10 is an integrated element comprised of an insulating substrate 100, front side protection member (front surface protection member) 110, and a rear side protection member (rear surface protection member) 120. The heat flux sensor 10 also comprises first and second interlayer connecting members 130, 140 connected alternatively in series inside the integrated component. Note that the front side protection member 110 is omitted in FIG. 2. The insulating substrate 100, the front side protection member 110, and the rear side protection member 120 have a film-like form (thin form) and are formed of a flexible resin material such as thermoplastic resin. The insulating substrate 100 comprises a plurality of first and second via holes 101, 102 which penetrate through its thickness. The first and second via holes 101 and 102 are filled with the first and second interlayer connecting members 130 and 140 formed of different thermoelectric materials such as metal or semiconductors. The contacts of the first and second interlayer connecting members 130 and 140 are configured as follows. One of the contacts of each of the first and second interlayer connection members 130, 140 has a front side conductor pattern 111 arranged on the front side (front surface) 100a of the insulating substrate 100. The other of the contacts of each of the first and second interlayer connection members 130 140 has a rear side conductor pattern 121 arranged on the rear side (rear surface) 100b of the insulating substrate 100.

When heat flux passes through the heat flux sensor 10 in the thickness direction of the heat flux sensor 10, a temperature difference occurs between one of the contacts of each of the first and second interlayer connection members 130, 140 and the other of the contacts of each of the first and second interlayer connection members 130, 140. The temperature difference induces a thermo-electromotive force in the first and second interlayer connection members 130, 140 by the See beck effect. The heat flux sensor 10 outputs the generated thermo-electromotive force as a sensor signal (for example, a voltage signal).

As illustrated in FIG. 1, the signal output from the heat flux sensor 10 is sent to the detection part 20. The detection part 20 includes a microcomputer, etc. and is configured as a computing device. Based on the signal output by the heat flux sensor 10, the detection part 20 can detect the support state of the target object 2 supported by the support device 50, or the size of the target object 2.

FIGS. 4(A) and 4(B) show an example of the operation of when the support device 50 supports the target object 2 at the correct position.

When supporting the target object 2, the support device 50 operates as follows. Specifically, first, from the state of FIG. 4(A), the piston rod 53 moves in the direction of the arrow D1, and the target object 2 is moved toward the elastic member 70. Then, as shown in FIG. 4(B), the target object 2 is sandwiched between the piston rod 53 and the elastic member 70 and thus supported by them. At this time, the elastic member 70 is compressed by the load applied from the piston rod 53. In FIG. 4(B), the amount of compression of the elastic member 70 at this time is indicated by E1.

That is, when the elastic member 70 absorbs the kinetic energy of the piston rod 53 and supports the target object 2, it converts kinetic energy (collision energy) into elastic potential energy. The elastic member 70 stores the absorbed kinetic energy as internal energy (repulsive force). At that time, the alignment of the molecules is deformed. Therefore, heat is generated in the elastic member 70 by internal friction. The amount of heat is proportional to the amount of deformation of the elastic member 70. Therefore, by monitoring the amount of deformation, the monitoring device 1 can monitor the magnitude of the internal energy (repulsive force) stored in the elastic member 70.

As described above, from the state of FIG. 4(A), when the piston rod 53 moves in the direction of the arrow D1, the target object 2 becomes supported by the piston rod 53 and the elastic member 70. At this time, the elastic member 70 is compressed and generates heat. As a result, a heat flow flows between the elastic member 70 and the fixed member 60 via the heat flux sensor 10. Accordingly, the heat flux sensor 10 outputs a voltage signal corresponding to the heat flux that flows as described above. The signal output from the heat flux sensor 10 is sent to the detection part 20.

Next, from the state of FIG. 4(B), when the piston rod 53 moves in the direction of the arrow D2, the target object 2 is released from the supporting by the piston rod 53 and the elastic member 70. The elastic member 70 returns to the thickness (original thickness) of before supporting the target object 2. At this time, the elastic member 70 absorbs the surrounding heat. As a result, a heat flow flows around the elastic member 70 via the heat flux sensor 10. In this manner, similarly to the heat flux generated by the heat generation of the elastic member 70, the heat flux generated by the heat absorption is also detected by the heat flux sensor 10. The signal output from the heat flux sensor 10 is sent to the detection part 20.

Figure 5:
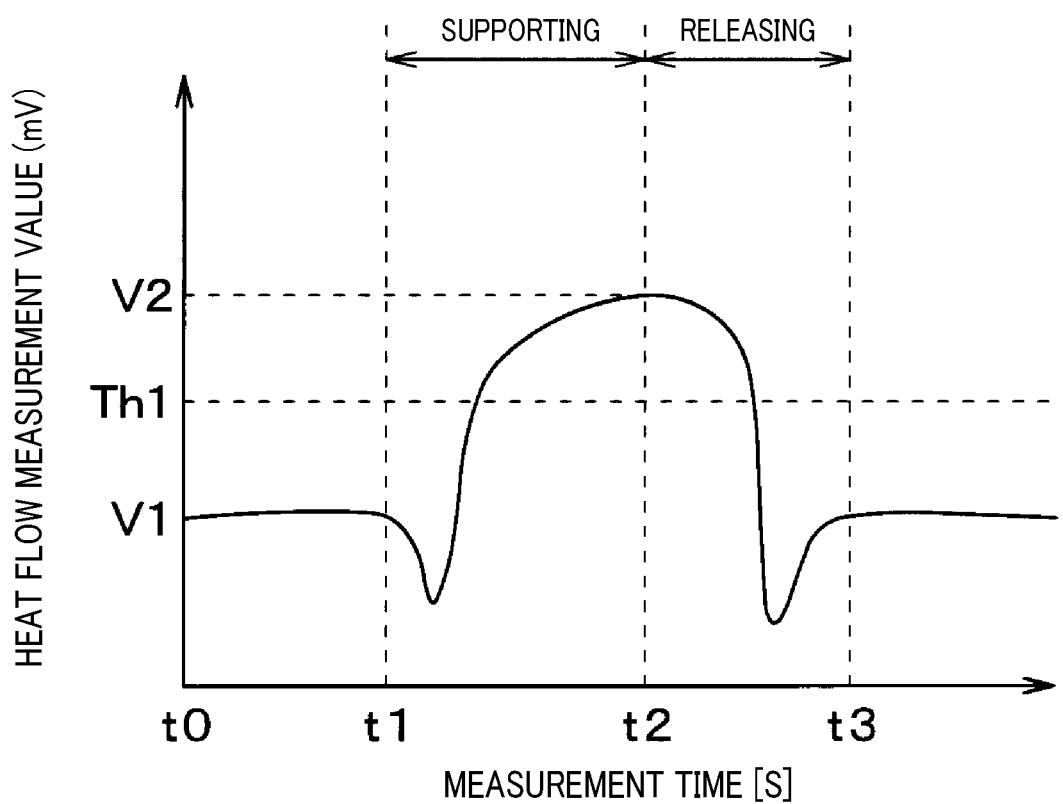
FIG. 5 is a graph showing an output waveform of the heat flux sensor in the state of FIG. 4.

The graph of FIG. 5 shows an example of the actual measurement of the output waveform of the heat flux sensor 10 when supporting operation and support releasing operation of the target object 2 are performed at the correct position. More specifically, the piston rod 53 shifts from the state of FIG. 4(A) to the state of FIG. 4(B), and supports the target object 2 for a certain period of time. After that, it shifts from the state of FIG. 4(B) to the state of FIG. 4(A) again, and the supporting state of the target object 2 is released. The actual measurement values shown in the graph of FIG. 5 were obtained by actually measuring the output waveform of the heat flux sensor 10 while the piston rod 53 was operating in such a manner.

The piston rod 53 moves in the direction of the arrow D1 shown in FIG. 4(A) from time t0. Then, the target object 2 that have moved together with the piston rod 53 comes into contact with the elastic member 70 at time t1. Therefore, from time t0 to t1, the output signal of the heat flux sensor 10 shows a substantially constant value V1.

From time t1 to t2, the target object 2 is in a state of being supported between the piston rod 53 and the elastic member 70. During that time period, the piston rod 53 applies load to the elastic member 70 via the target object 2. Thus, the elastic member 70 is compressed and generates heat. As a result, a heat flow flows from the elastic member 70 to the fixed member 60 via the heat flux sensor 10. Therefore, the output signal of the heat flux sensor 10 shows output characteristics as follows. Specifically, the output signal once decreases after time t1, but then rises until time t2, and shows the maximum value V2 around time t2.

The piston rod 53 moves in the direction of the arrow D2 shown in FIG. 4(B) from time t2. After that, from time t2 to t3, the load applied from the piston rod 53 to the elastic member 70 via the target object 2 becomes released. Thus, the elastic member 70 returns to the thickness (original thickness) of before supporting the target object 2. Therefore, the elastic member 70 absorbs heat. As a result, a heat flow flows from the fixed member 60 to the elastic member 70 via the heat flux sensor 10. Therefore, the output signal of the heat flux sensor 10 shows output characteristics as follows. Specifically, the output signal decreases after time t2, and at time t3, it becomes substantially the same as the value V1 which is the value before the target object 2 contacts with the elastic member 70. After time t3, the output signal of the heat flux sensor 10 shows a substantially constant value.

Here, it is assumed that the experiment of the supporting operation and the support releasing operation of the target object 2 described above has been performed a plurality of times in a state where the target object 2 is supported at the correct position. In this case, the maximum value of the signal output from the heat flux sensor 10 is substantially constant. Therefore, in the present embodiment, the lower limit of the maximum value of the output signal of the heat flux sensor 10 is determined in advance based on such multiple times of experiments or the like. For example, the detection part 20 stores the determined lower limit as the first threshold value Th1 in a storage device (predetermined storage area) including a non-transitory tangible computer readable medium such as a memory provided in the detection device 20.

As shown in FIG. 5S, when the maximum value V2 of the output of the heat flux sensor 10 is larger than the first threshold value Th1 during the time period from time t1 to time t3, the detection part 20 determines that the target object 2 is being supported at the correct position by the piston rod 53 and the elastic member 70. In addition, at this time, the detection part 20 can also judge whether the size of the target object 2 is the permitted size or larger than the permitted size. The method of determining the size of the target object 2 by the detecting part 20 will be described later.

FIGS. 6(A) and (B) show an example of the operation of when the support device 50 supports the target object 2 at a position deviated from the correct position with respect to the axial center of the piston rod 53.

In FIGS. 6(A) and (B), the correct position of the target object 2 is indicated by an alternate long and short dashed line P1. In FIGS. 6(A) and (B), the target object 2 is at a position deviated from the correct position. Thus, as shown in FIG. 6(B), when the target object 2 is supported between the piston rod 53 and the elastic member 70, the load from the piston rod 53 is applied to a partial area of the elastic member 70. Therefore, the part of the elastic member 70 to which the load is applied is compressed. In FIG. 6(B), the amount of compression of the elastic member 70 at this time is indicated by E2. The compression amount E2 shown in FIG. 6(B) is larger than the compression amount E1 shown in FIG. 4(B).

Figure 7:
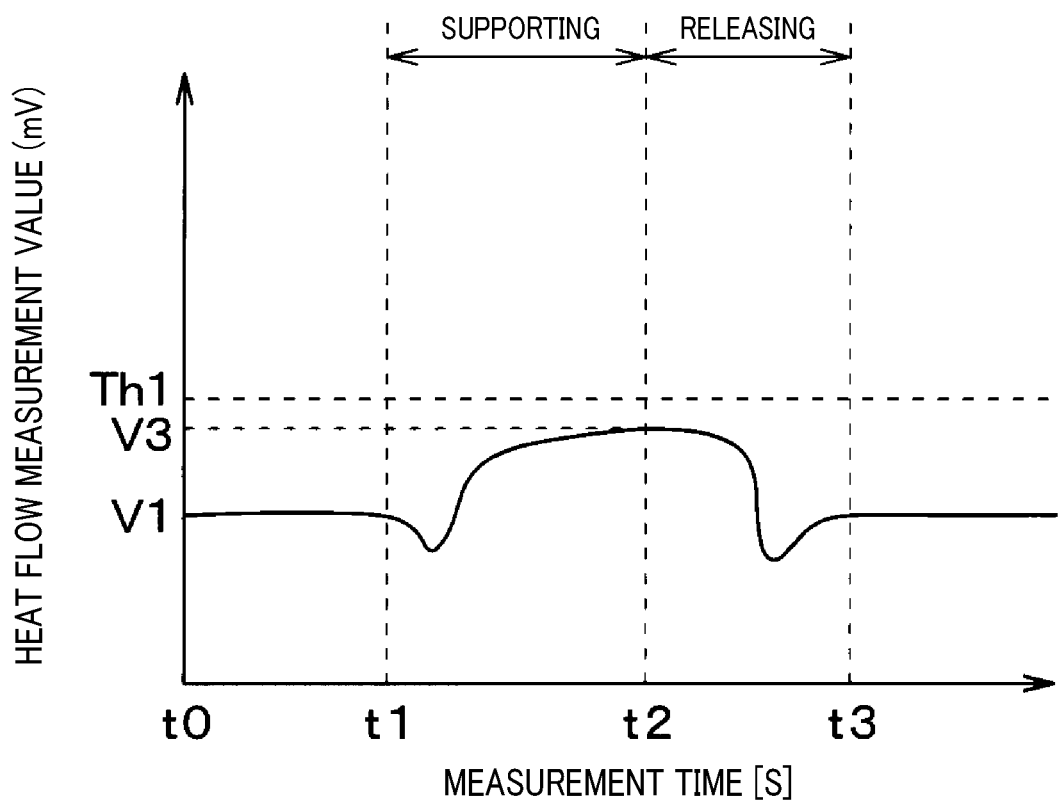
FIG. 7 is a graph showing an output waveform of the heat flux sensor in the state of FIG. 6.

The graph of FIG. 7 shows an example of the actual measurement of the output waveform of the heat flux sensor 10 when supporting operation and support releasing operation of the target object 2 are performed at a shifted position. More specifically, the piston rod 53 shifts from the state of FIG. 6(A) to the state of FIG. 6(B), and supports the target object 2 for a certain period of time. After that, it shifts from the state of FIG. 6(B) to the state of FIG. 6(A) again, and the supporting state of the target object 2 is released. The actual measurement values shown in the graph of FIG. 7 were obtained by actually measuring the output waveform of the heat flux sensor 10 while the piston rod 53 was operating in such a manner.

The piston rod 53 moves in the direction of the arrow D1 shown in FIG. 6(A) from time t0. Then, the target object 2 that have moved together with the piston rod 53 comes into contact with the elastic member 70 at time t1.

From time t1 to t2, the target object 2 is in a state of being supported between the piston rod 53 and the elastic member 70. During that time period, the piston rod 53 applies load to the elastic member 70 via the target object 2. However, when the target object 2 is at a position deviated from the correct position, the load is applied to a part of the area of the elastic member 70. Thus, a part of the elastic member 70 is compressed and deformed. As a result, the amount of heat generated in the elastic member 70 is smaller than the amount of heat generated in the elastic member 70 when the target object 2 is supported at the correct position. Therefore, the output signal of the heat flux sensor 10 shows output characteristics as follows. Specifically, the output signal increases from time t1 to time t2 and shows the maximum value V3 around time t2. The maximum value V3 of the output signal at this time is smaller than the maximum value V2 shown in FIG. 5.

The piston rod 53 moves in the direction of the arrow D2 shown in FIG. 6(B) from time t2. After that, from time t2 to t3, the load applied from the piston rod 53 to the elastic member 70 via the target object 2 becomes released. Thus, the elastic member 70 returns to the thickness (original thickness) of before supporting the target object 2. Therefore, the output signal of the heat flux sensor 10 shows output characteristics as follows. Specifically, the output signal decreases after time t2, and at time t3, it becomes substantially the same as the value V1 which is the value before the target object 2 contacts with the elastic member 70.

As shown in FIG. 7, when the maximum value V3 of the output of the heat flux sensor 10 is smaller than the first threshold value Th1 during the time period from time t1 to time t3, the detection part 20 determines that the target object 2 is being supported at a position deviated from the correct position by the piston rod 53 and the elastic member 70. In addition, at this time, the detection part 20 can also judge whether the size of the target object 2 is smaller than the permitted size. The method of determining the size of the target object 2 by the detecting part 20 will be described later.

FIGS. 8(A) and (B) show an operation example of when the target object 2 falls from the support device 50 without being supported by it.

As shown in FIG. 8(B), when the target object 2 falls from the space between the piston rod 53 and the elastic member 70, the load from the piston rod 53 is not applied to the elastic member 70. Therefore, the elastic member 70 will not be elastically deformed.

Figure 9:
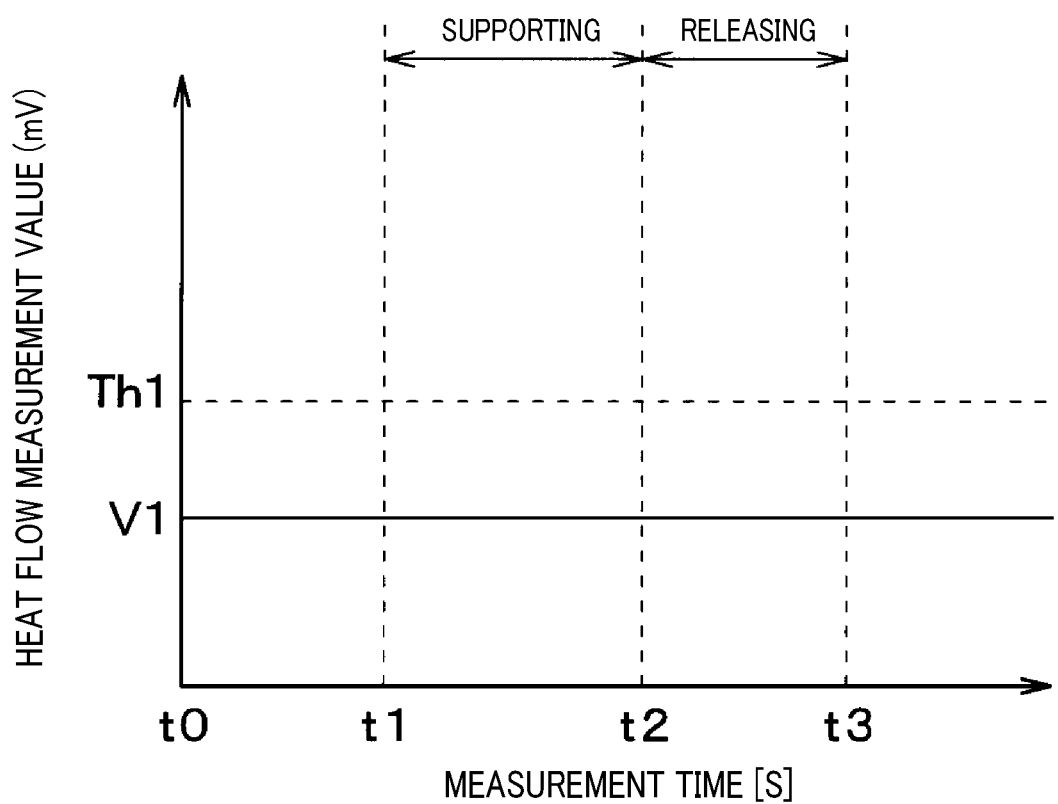
FIG. 9 is a graph showing an output waveform of the heat flux sensor in the state of FIG. 8.

The graph of FIG. 9 shows an example of the actual measurement of the output waveform of the heat flux sensor 10 when the piston rod 53 performs the operation without supporting the target object 2. More specifically, the piston rod 53 shifts from the state of FIG. 8(A) to the state of FIG. 8(B), and, without supporting the target object 2, returns from the state of FIG. 8(B) to the state of FIG. 8(A). The actual measurement values shown in the graph of FIG. 9 were obtained by actually measuring the output waveform of the heat flux sensor 10 while the piston rod 53 was operating in such a manner.

As shown in FIG. 9, from time t0 to time t3, the output signal of the heat flux sensor 10 shows a substantially constant value V1. In this case, the detection part 20 determines that the target object 2 is not being supported by the piston rod 53 and the elastic member 70.

Next, the method of determining the size of the target object by the detecting part 20 will be described.

FIGS. 10(A) and (B) show an operation example of when the support device 50 supports a target object 2* that is smaller than the permitted size.

Here, it is assumed that the piston rod 53 is configured such that the movement range in the axial direction or the air pressure supplied to the first chamber 56 is fixed.

In FIGS. 10(A) and (B), the permitted size of the target object is indicated by an alternate long and short dashed line P2. In FIGS. 10(A) and (B), the target object 2* is smaller than the permitted size. Thus, as shown in FIG. 10(B), when the target object 2* is supported between the piston rod 53 and the elastic member 70, the compressed thickness of the elastic member 70 is small. In FIG. 10(B), the amount of compression of the elastic member 70 at this time is indicated by E3. The compression amount E3 shown in FIG. 10(B) is smaller than the compression amount E1 shown in FIG. 4(B).

Figure 11:
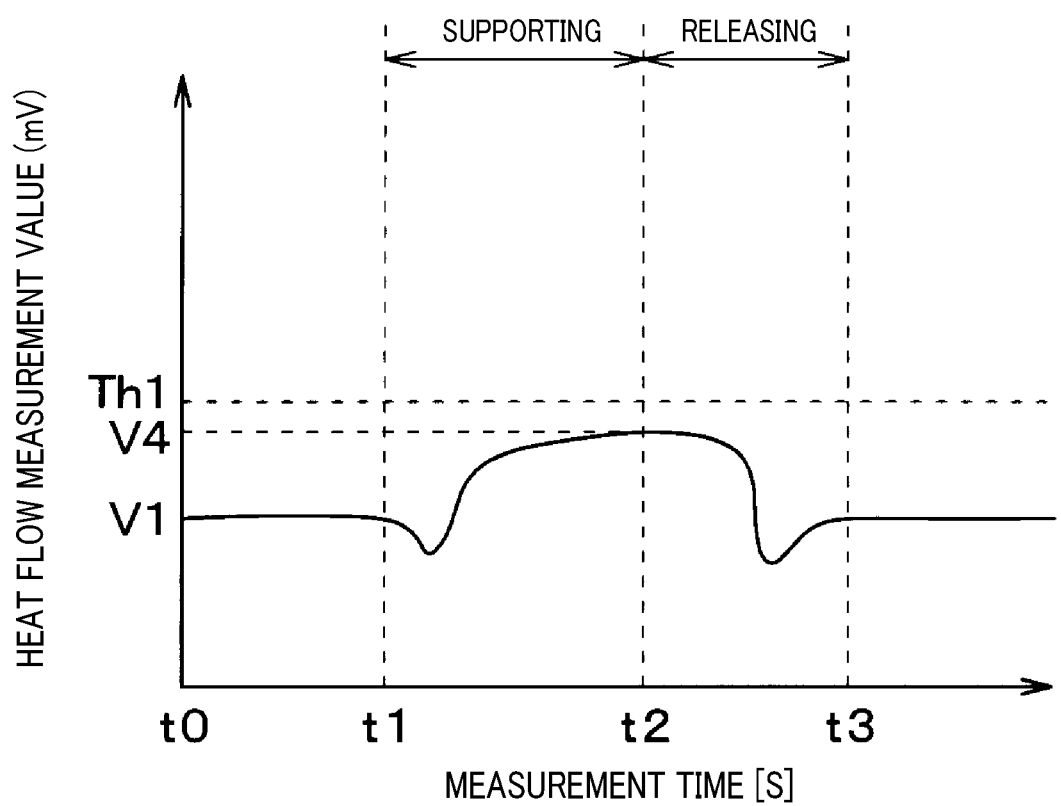
FIG. 11 is a graph showing an output waveform of the heat flux sensor in the state of FIG. 10.

The graph of FIG. 11 shows an example of the actual measurement of the output waveform of the heat flux sensor 10 when supporting operation and support releasing operation of the target object 2* smaller than the permitted size are performed. More specifically, the piston rod 53 shifts from the state of FIG. 10(A) to the state of FIG. 10(B), and supports the target object 2* for a certain period of time. After that, it shifts from the state of FIG. 10(B) to the state of FIG. 10(A) again, and the supporting state of the target object 2* is released. The actual measurement values shown in the graph of FIG. 11 were obtained by actually measuring the output waveform of the heat flux sensor 10 while the piston rod 53 was operating in such a manner.

The piston rod 53 moves in the direction of the arrow D1 shown in FIG. 10(A) from time t0. Then, the target object 2* that have moved together with the piston rod 53 comes into contact with the elastic member 70 at time t1.

From time t1 to t2, the target object 2* is in a state of being supported between the piston rod 53 and the elastic member 70. During that time period, the piston rod 53 applies load to the elastic member 70 via the target object 2*. However, as described above, the compression amount E3 of the elastic member 70 is smaller than the compression amount E1 shown in FIG. 4(B). As a result, the amount of heat generated in the elastic member 70 is smaller than the amount of heat generated in the elastic member 70 when the target object 2* has a permitted size. Therefore, the output signal of the heat flux sensor 10 shows output characteristics as follows. Specifically, the output signal increases from time t1 to time t2 and shows the maximum value V4 around time t2. The maximum value V4 of the output signal at this time is smaller than the maximum value V2 of the output signal shown in FIG. 5.

The piston rod 53 moves in the direction of the arrow D2 shown in FIG. 10(B) from time t2. After that, from time t2 to t3, the load applied from the piston rod 53 to the elastic member 70 via the target object 2 becomes released. Thus, the elastic member 70 returns to the thickness (original thickness) of before supporting the target object 2*. Therefore, the output signal of the heat flux sensor 10 shows output characteristics as follows. Specifically, the output signal decreases after time t2, and at time t3, it becomes substantially the same as the value V1 which is the value before the target object 2* contacts with the elastic member 70.

As shown in FIG. 11, when the maximum value V4 of the output of the heat flux sensor 10 is smaller than the first threshold value Th1 during the time period from time t1 to time t3, the detection part 20 can determine that the target object 2* is being supported at a position deviated from the correct position or the target object 2 is smaller than the permitted size.

FIGS. 12(A) and (B) show an operation example of when the support device 50 supports a target object 2** that is larger than the permitted size.

Here, as described above, it is assumed that the piston rod 53 is configured such that the movement range in the axial direction or the air pressure supplied to the first chamber 56 is fixed.

In FIGS. 12(A) and (B), the permitted size of the target object is indicated by an alternate long and short dashed line P3. In FIGS. 12(A) and (B), the target object 2 is larger than the permitted size. Thus, as shown in FIG. 12(B), when the target object 2 is supported between the piston rod 53 and the elastic member 70, the compressed thickness of the elastic member 70 is large. In FIG. 12(B), the amount of compression of the elastic member 70 at this time is indicated by E4. The compression amount E4 shown in FIG. 12(B) is larger than the compression amount E1 shown in FIG. 4(B).

Figure 13:
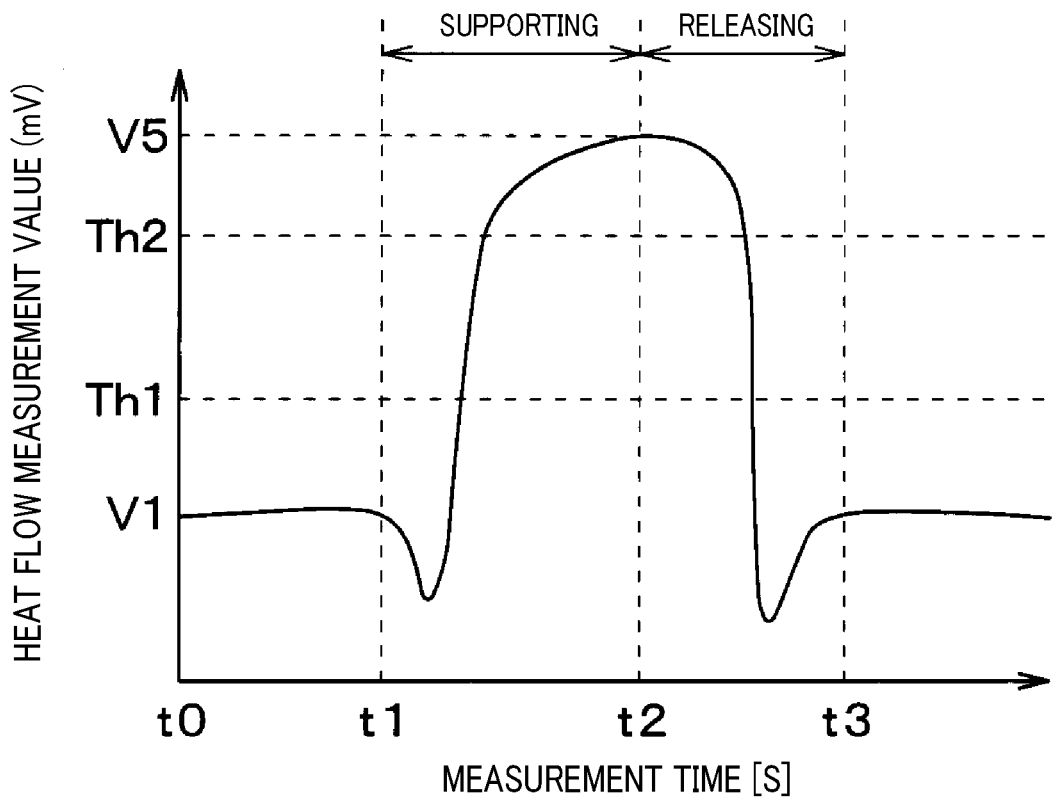
FIG. 13 is a graph showing an output waveform of the heat flux sensor in the state of FIG. 12.

The graph of FIG. 13 shows an example of the actual measurement of the output waveform of the heat flux sensor 10 when supporting operation and support releasing operation of the target object 2 larger than the permitted size are performed. More specifically, the piston rod 53 shifts from the state of FIG. 12(A) to the state of FIG. 12(B), and supports the target object 2 for a certain period of time. After that, it shifts from the state of FIG. 12(B) to the state of FIG. 12(A) again, and the supporting state of the target object 2** is released. The actual measurement values shown in the graph of FIG. 13 were obtained by actually measuring the output waveform of the heat flux sensor 10 while the piston rod 53 was operating in such a manner.

The piston rod 53 moves in the direction of the arrow D1 shown in FIG. 12(A) from time t0. Then, the target object 2** that have moved together with the piston rod 53 comes into contact with the elastic member 70 at time t1.

From time t1 to t2, the target object 2 is in a state of being supported between the piston rod 53 and the elastic member 70. During that time period, the piston rod 53 applies load to the elastic member 70 via the target object 2. Here, as described above, it is assumed that the piston rod 53 is configured such that the movement range in the axial direction or the air pressure supplied to the first chamber 56 is fixed. Thus, the compression amount E4 of the elastic member 70 is larger than the compression amount E1 shown in FIG. 4(B). As a result, the amount of heat generated in the elastic member 70 is larger than the amount of heat generated in the elastic member 70 when the target object 2** is supported at the correct position. Therefore, the output signal of the heat flux sensor 10 shows output characteristics as follows. Specifically, the output signal increases from time t1 to time t2 and shows the maximum value V5 around time t2. The maximum value V5 of the output signal at this time is larger than the maximum value V2 of the output signal shown in FIG. 5.

The piston rod 53 moves in the direction of the arrow D2 shown in FIG. 10(B) from time t2. After that, from time t2 to t3, the load applied from the piston rod 53 to the elastic member 70 via the target object 2 becomes released. Thus, the elastic member 70 returns to the thickness (original thickness) of before supporting the target object 2. Therefore, the output signal of the heat flux sensor 10 shows output characteristics as follows. Specifically, the output signal decreases after time t2, and at time t3, it becomes substantially the same as the value V1 which is the value before the target object 2 contacts with the elastic member 70.

Here, it is assumed that the experiment of the supporting operation and the releasing operation of the target object 2 described above has been performed a plurality of times. In this case, when the target object 2 has a permitted size and is supported at the correct position, the maximum value of the signal output from the heat flux sensor 10 is substantially constant. Therefore, in the present embodiment, the upper limit of the maximum value of the output signal of the heat flux sensor 10 is determined in advance based on such multiple times of experiments or the like. The detection part 20 stores the determined upper limit as the second threshold Th2.

As shown in FIG. 13, when the maximum value V5 of the output of the heat flux sensor 10 is greater than the second threshold value Th2 during the time period from time t1 to time t3, the detection part 20 determines that the target object 2** has a size larger than the permitted size.

As described above, the monitoring device 1 of this embodiment provides functions and effects as follow.

(1) In this embodiment, when the target object 2 is supported between the piston rod 53 and the fixed member 60 by the movement of the piston rod 53, the elastic member 70 is deformed elastically by the load applied from the piston rod 53, and generates or absorbs heat. Thus, the monitoring device 1 detects the heat flux flowing between the elastic member 70 and the outside with the heat flux sensor 10. As a result, the monitoring device 1 can determine whether or not the target object 2 is being supported at the correct position by the piston rod 53 and the fixed member 60. Alternatively, the monitoring device 1 can detect the size of the target object 2.

The heat flux sensor 10 has sufficient rigidity against the load applied in its thickness direction from the piston rod 53. In addition, the heat flux sensor 10 has a small thickness. Therefore, the support device 50 is not increased in size.

(2) In this embodiment, when the output of the heat flux sensor 10 is larger than the first threshold value Th1, the detection part 20 determines that the target object 2 is being supported at the correct position by the piston rod 53 and the fixed member 60. On the other hand, when the output of the heat flux sensor 10 is smaller than the first threshold value Th1, the detection part 20 determines that the target object 2 is not being supported at the correct position by the piston rod 53 and the fixed member 60. Alternatively, the detection part 20 determines that the size of the target object 2 is smaller than the permitted size.

As described above, in the present embodiment, the detection part 20 stores thresholds obtained through experiments or the like in a storage device (predetermined storage area). As a result, the monitoring device 1 can determine whether or not the target object 2 is being supported at the correct position based on the signal output by the heat flux sensor 10. Alternatively, the monitoring device 1 can determine whether or not the size of the target object 2 is smaller than the permitted size.

(3) In the present embodiment, the detection part 20 stores the first threshold Th1 and the second threshold value Th2 that is greater than the first threshold value Th1. When the output of the heat flux sensor 10 is greater than the second threshold value Th2, the detection part 20 determines that the target object 2 has a size larger than the permitted size.

When the size of the target object 2 is larger than the permitted size, the amount of compression of the elastic member 70 increases. Thus, the heating amount of the elastic member 70 increases, and accordingly the output of the heat flux sensor 10 also increases. In view of this, in the present embodiment, the detection part 20 stores the second threshold Th2 determined through experiments or the like in a predetermined storage area thereof. As a result, the monitoring device 1 can determine whether or not the target object 2 has a size larger than the permitted size based on the signal output by the heat flux sensor 10.

(4) In this embodiment, the heat flux sensor 10 is provided between the elastic member 70 and the fixed member 60.

As a result, in this embodiment, the heat flow flows well through the elastic member 70, the heat flux sensor 10, and the fixed member 60. Accordingly, it is possible to improve the detection accuracy of the heat flux sensor 10.

For example, in a conventional apparatus, it is assumed that the heat flux sensor 10 is attached to the face of the elastic member 70 on the outer side (open air side). In this case, the air around the heat flux sensor 10 stagnates, and the heat flow does not flow well through the heat flux sensor 10. In contrast, in the present embodiment, since the heat flux sensor 10 is provided between the elastic member 70 and the fixed member 60, it is possible to let the heat flow well.

Further, according to the configuration of the present embodiment, it is possible to prevent the heat flux sensor 10 from detaching from the elastic member 70, as compared with the case where the heat flux sensor 10 is attached to the face of the elastic member 70 on the outer side (outside air side).

(5) In this embodiment, the elastic member 70 is provided on the target object 2 side of the fixed member 60. In addition, the heat flux sensor 10 is provided between the elastic member 70 and the fixed member 60.

For example, in a conventional apparatus, it is assumed that the heat flux sensor 10 is attached to the piston rod 53.

In this case, the movement of the piston rod 53 generates frictional heat. As a result, the heat flux resulting from the frictional heat affects the output of the heat flux sensor 10. In contrast, in the present embodiment, since the heat flux sensor 10 is provided between the elastic member 70 and the fixed member 60, no frictional heat is generated and the output of the heat flux sensor 10 is not affected.

Second Embodiment

The present embodiment will be described with reference to the drawings. Note that the second to fifth embodiments described below are different from the first embodiment in the configuration of the support device 50 and the manner the heat flux sensor 10 is attached. The other aspects are the same as the first embodiment. Therefore, only the parts that are different from the first embodiment will be described below.

Figure 14:
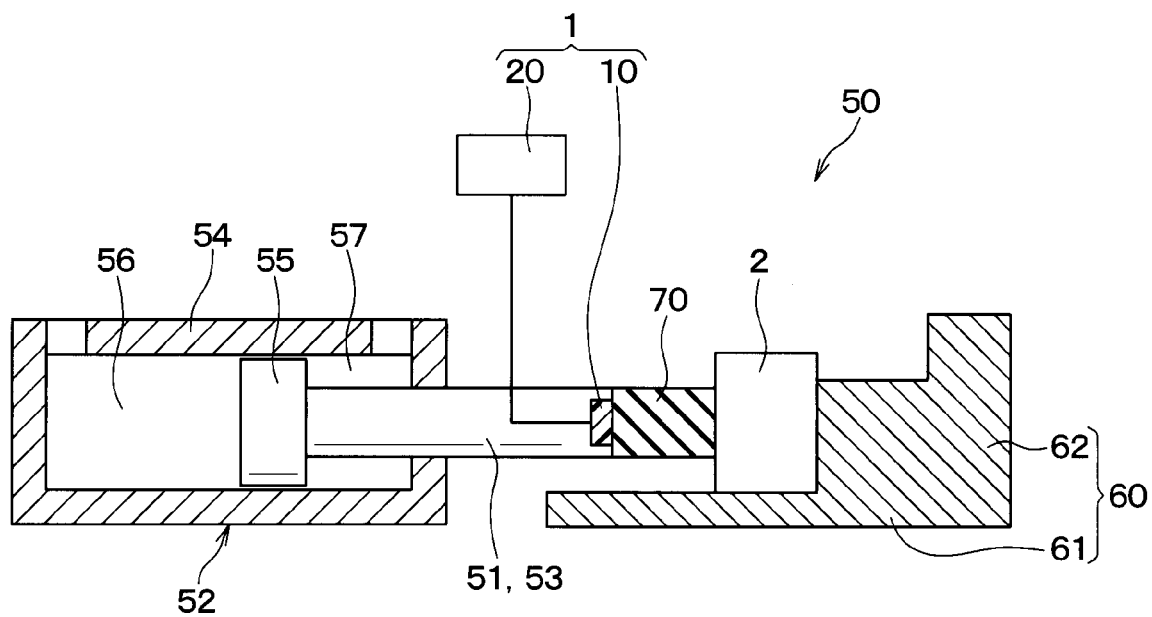
FIG. 14 is a cross-sectional view of the support device to which the monitoring device is attached according to the second embodiment.

As illustrated in FIG. 14, according to the support device 50 of the present embodiment, the elastic member 70 is provided on the target object 2 side of the piston rod 53 as the movable member 51.

The fixed part 62 of the fixed member 60 functions as a stopper for regulating the movement of the target object 2. Therefore, the target object 2 is supported between the elastic member 70 provided on the piston rod 53 and the fixed member 60.

The heat flux sensor 10 of the monitoring device 1 is provided between the piston rod 53 and the elastic member 70. When the target object 2 is supported between the elastic member 70 and the fixed member 60 by the movement of the piston rod 53, the elastic member 70 is compressed by the load applied from the piston rod 53 and the reaction force from the target object 2 and generates heat. At this time, the heat flux sensor 10 outputs a voltage signal corresponding to the heat flux flowing between the elastic member 70 and the piston rod 53 via the heat flux sensor 10.

The signal output from the heat flux sensor 10 is sent to the detection part 20. In the same manner as in the above-described first embodiment, the detection part 20 detects the support state of the target object 2 supported by the support device 50, or the size of the target object 2.

Therefore, the monitoring device 1 of the present embodiment produces the same effects as those of the above-described first embodiment.

Third Embodiment

Figure 15:
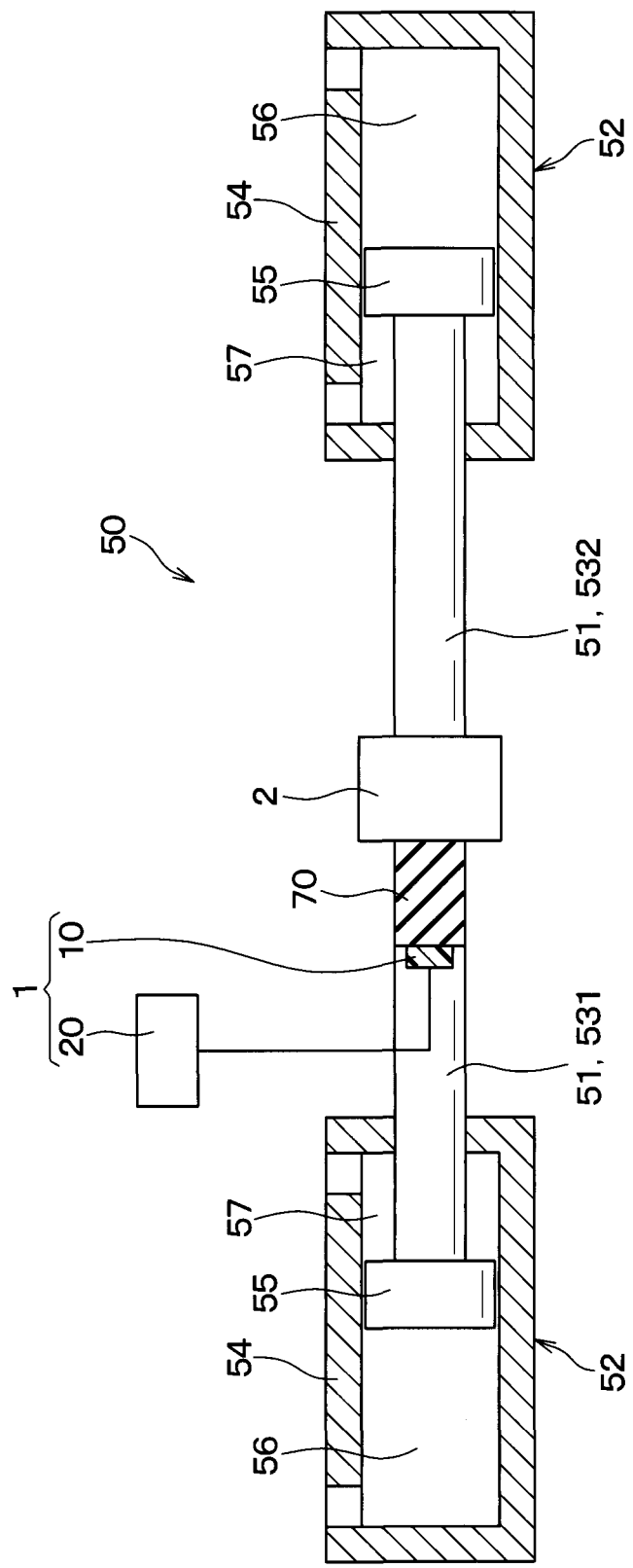
FIG. 15 is a cross-sectional view of the support device to which the monitoring device is attached according to the third embodiment.

The present embodiment will be described with reference to the drawings. As illustrated in FIG. 15, in the present embodiment, the support device 50 comprises two movable members 51 and the elastic member 70. The two movable members 51 correspond to an example of the "support member" recited in the claims.

The movable members 51 are the respective piston rods 531, 532 of two air cylinders 52. The two piston rods 531, 532 are disposed so that the target object 2 is interposed between the piston rods 531, 532. In the description of this embodiment, one of the piston rods 53 sandwiching the target object 2 is referred to as a first piston rod 531. The other piston rod 53 is referred to as a second piston rod 532.

As with the second embodiment, in this embodiment, the elastic member 70 is provided on the target object 2 side of the first piston rod 531. Therefore, the target object 2 is supported between the elastic member 70 provided on the first piston rod 531 and the second piston rod 532.

Since the configuration of the heat flux sensor 10 and the detection part 20 comprised in the monitoring device 1 is substantially the same as that of the second embodiment described above, the description thereof will be omitted.

The monitoring device 1 of the present embodiment produces the same effects as those of the above-described first and second embodiments.

Fourth Embodiment

Figure 16:
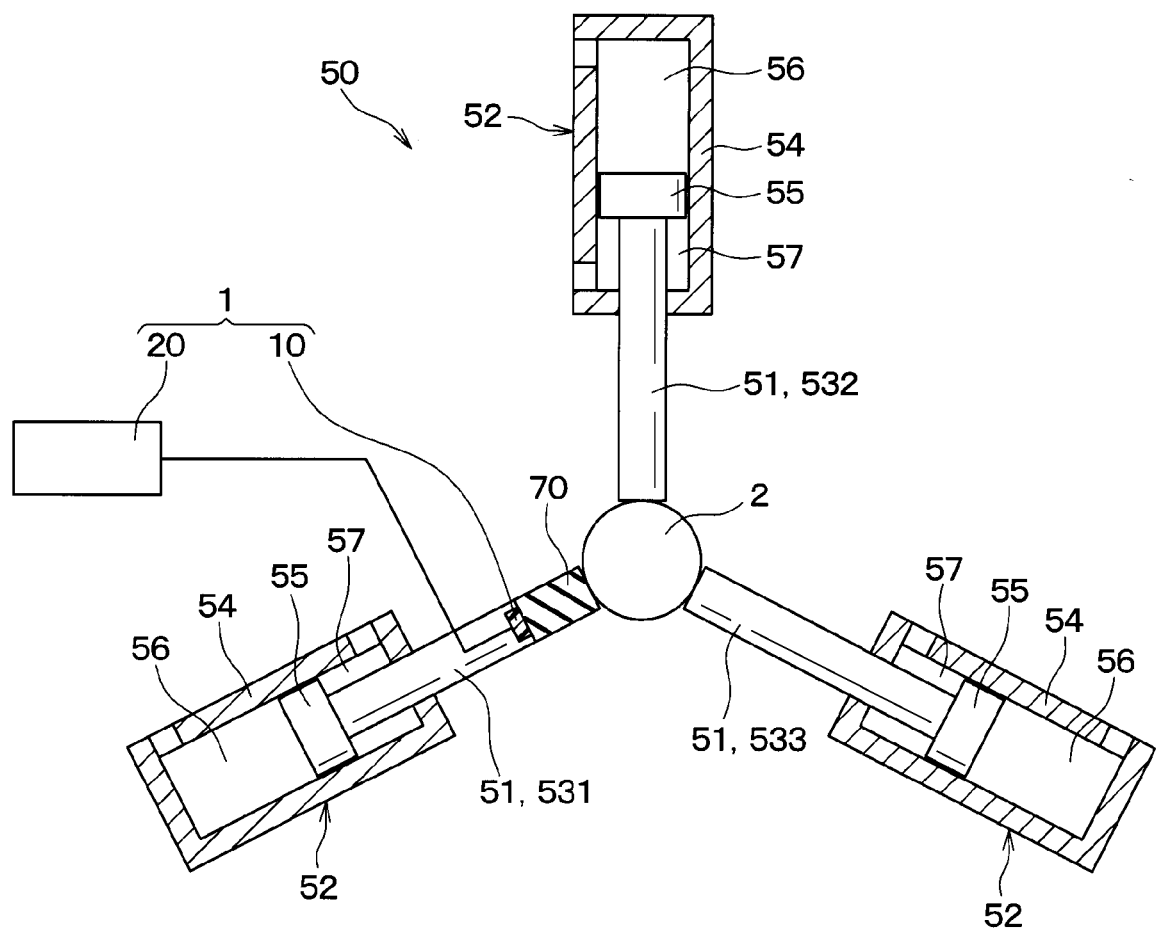
FIG. 16 is a cross-sectional view of the support device to which the monitoring device is attached according to the fourth embodiment.

The present embodiment will be described with reference to the drawings. As illustrated in FIG. 16, in the present embodiment, the support device 50 comprises three movable members 51 and the elastic member 70. The three movable members 51 each correspond to an example of the "support member" recited in the claims.

The three movable members 51 are the respective piston rods 531, 532, 533 of three air cylinders 52. The three piston rods 531, 532, 533 are placed around the target object 2 circumferentially. In the description of this embodiment, the three piston rods placed around the target object 2 are respectively referred to as a first piston rod 531, a second piston rod 532, and a third piston rod 533.

As with the second and third embodiments, in this embodiment, the elastic member 70 is provided on the target object 2 side of the first piston rod 531. Therefore, the target object 2 is supported by the elastic member 70 provided on the first piston rod 531, the second piston rod 532, and the third piston rod 533.

Since the configuration of the heat flux sensor 10 and the detection part 20 comprised in the monitoring device 1 is substantially the same as those of the second and third embodiments described above, the description thereof will be omitted.

The monitoring device 1 of the present embodiment produces the same effects as those of the above-described first to third embodiments.

Fifth Embodiment

Figure 17:
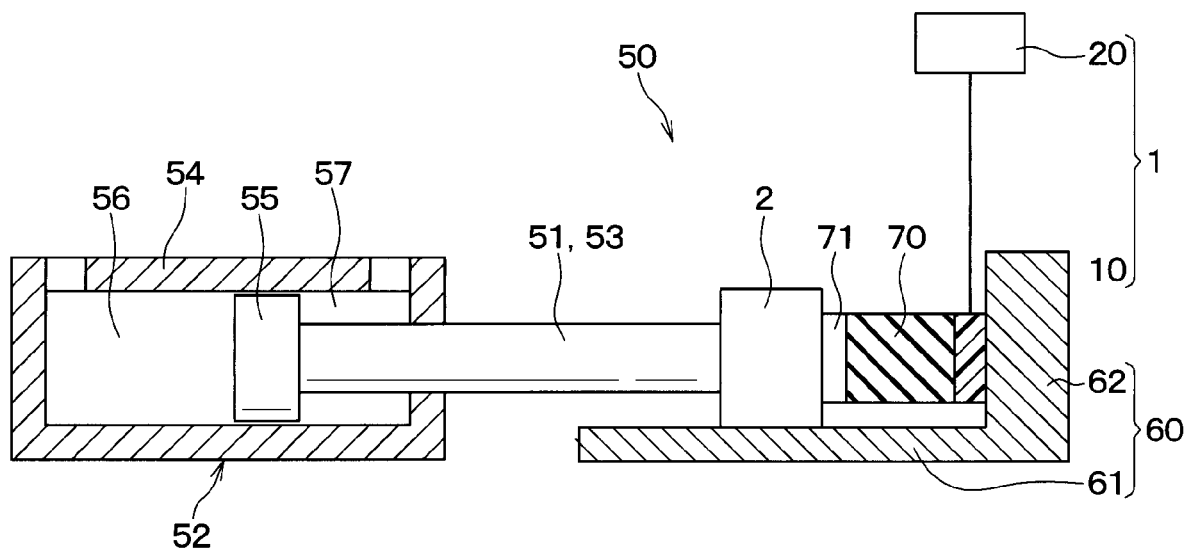
FIG. 17 is a cross-sectional view of the support device to which the monitoring device is attached according to the fifth embodiment.

The present embodiment will be described with reference to the drawings. As illustrated in FIG. 17, in the present embodiment, the support device 50 described in the first embodiment further comprises a plate 71 on the target object 2 side of the elastic member 70.

Such configuration of the monitoring device 1 also produces the same effects as those of the above-described first to fourth embodiments.

In the following, the sixth to seventeenth embodiments will be described with reference to the drawings. The sixth to seventeenth embodiments are different from the first embodiment in the manner the heat flux sensor 10 is fixed to the fixed member 60. Therefore, in FIGS. 18 to 29 corresponding to the sixth to seventeenth embodiments, cross-sectional views of a part of the support device 50 to which the monitoring device 1 is attached are illustrated.

Note that the methods of fixing the heat flux sensor 10 shown in the sixth to seventeenth embodiments may be combined as desired. Further, the methods of fixing the heat flux sensor 10 shown in the sixth to seventeenth embodiments may be applied to the above-described second to fifth embodiments.

Sixth Embodiment

Figure 18:
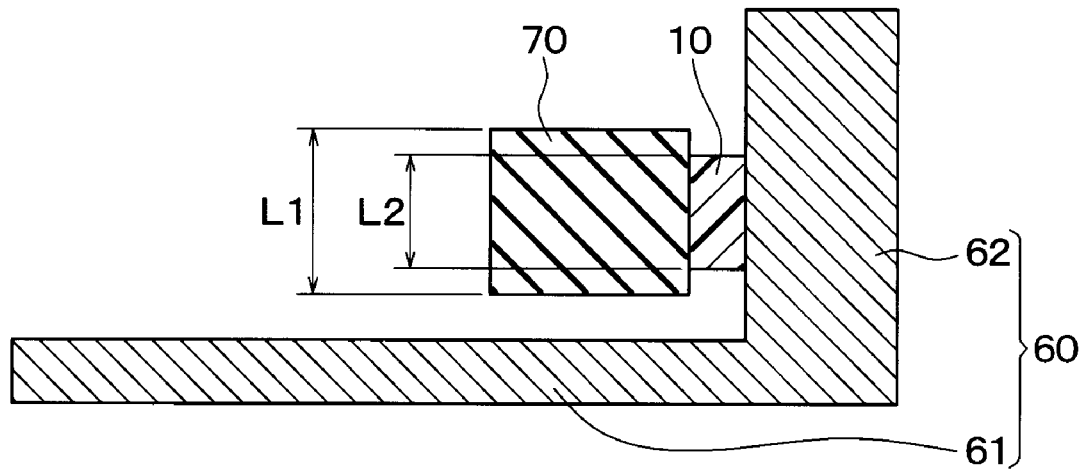
FIG. 18 is a cross-sectional view of a part of the support device to which the monitoring device is attached according to the sixth embodiment.

The present embodiment will be described. As illustrated in FIG. 18, in the present embodiment, the size L2 of the heat flux sensor 10 is smaller than the size L1 of the elastic member 70. Such configuration of the monitoring device 1 also produces the same effects as those of the above-described first to fifth embodiments.

Seventh Embodiment

Figure 19:
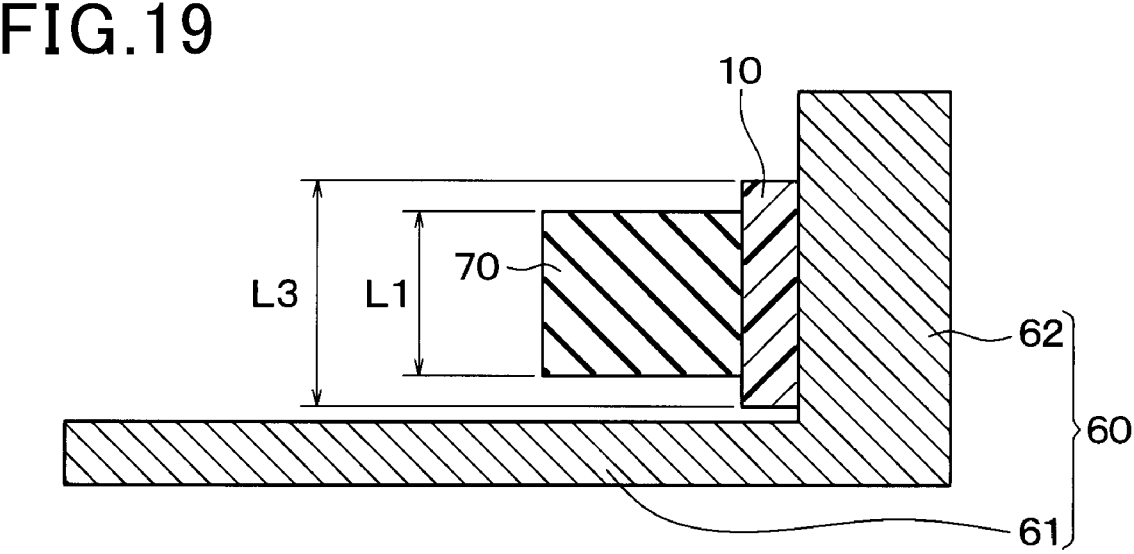
FIG. 19 is a cross-sectional view of a part of the support device to which the monitoring device is attached according to the seventh embodiment.

The present embodiment will be described. As illustrated in FIG. 19, in the present embodiment, the size L3 of the heat flux sensor 10 is larger than the size L1 of the elastic member 70. Such configuration of the monitoring device 1 also produces the same effects as those of the above-described first to sixth embodiments.

Eighth Embodiment

Figure 20:
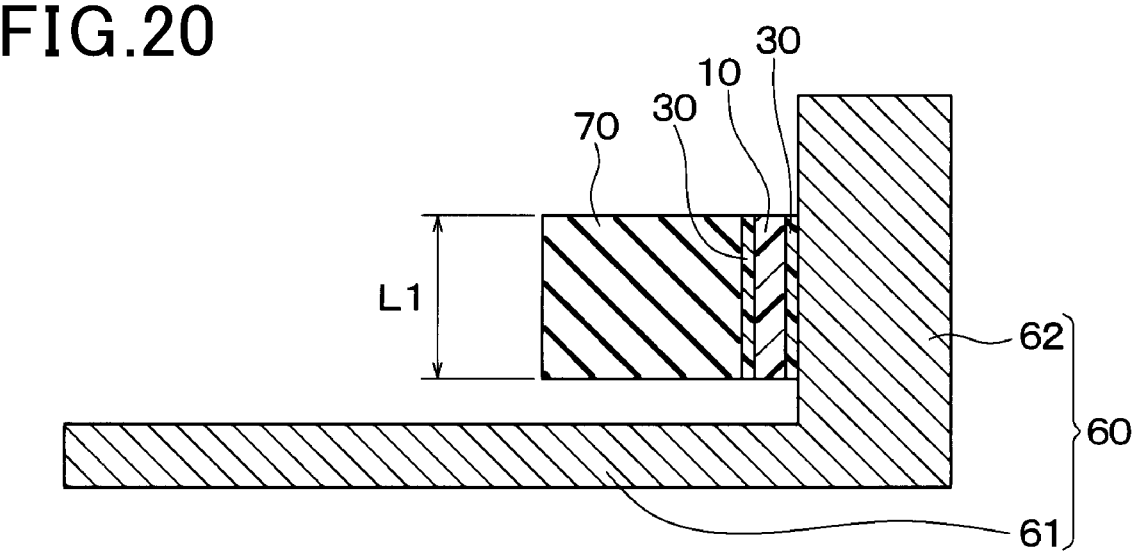
FIG. 20 is a cross-sectional view of a part of the support device to which the monitoring device is attached according to the eighth embodiment.

The present embodiment will be described. As illustrated in FIG. 20, in the present embodiment, the size of the heat flux sensor 10 is substantially the same as the size L1 of the elastic member 70. The heat flux sensor 10 is attached to the fixed part 62 and the elastic member 70 by an adhesive 30. Such configuration of the monitoring device 1 also produces the same effects as those of the above-described first to seventh embodiments.

Ninth Embodiment

Figure 21:
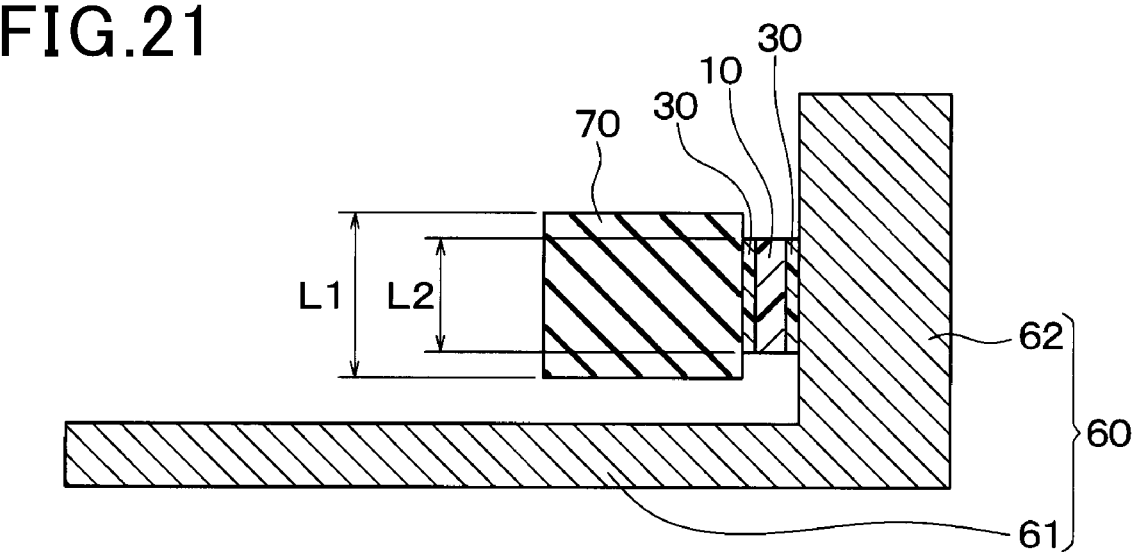
FIG. 21 is a cross-sectional view of a part of the support device to which the monitoring device is attached according to the ninth embodiment.

The present embodiment will be described. As illustrated in FIG. 21, in the present embodiment, the size L2 of the heat flux sensor 10 is smaller than the size L1 of the elastic member 70. The heat flux sensor 10 is attached to the fixed part 62 and the elastic member 70 by an adhesive 30. Such configuration of the monitoring device 1 also produces the same effects as those of the above-described first to eighth embodiments.

Tenth Embodiment

Figure 22:
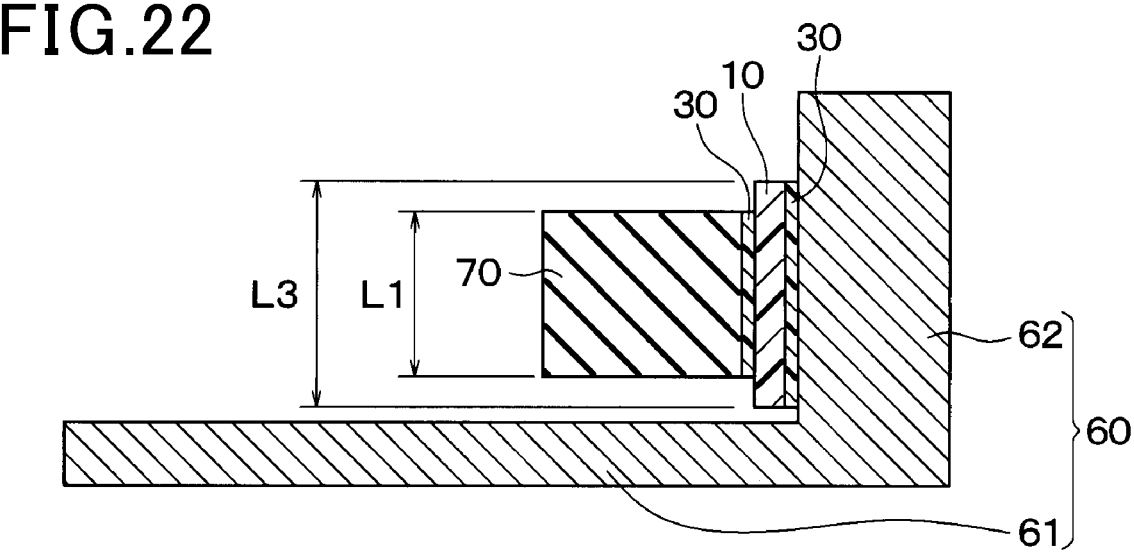
FIG. 22 is a cross-sectional view of a part of the support device to which the monitoring device is attached according to the tenth embodiment.

The present embodiment will be described. As illustrated in FIG. 22, in the present embodiment, the size L3 of the heat flux sensor 10 is larger than the size L1 of the elastic member 70. The heat flux sensor 10 is attached to the fixed part 62 and the elastic member 70 by an adhesive 30. Such configuration of the monitoring device 1 also produces the same effects as those of the above-described first to ninth embodiments.

Eleventh Embodiment

Figure 23:
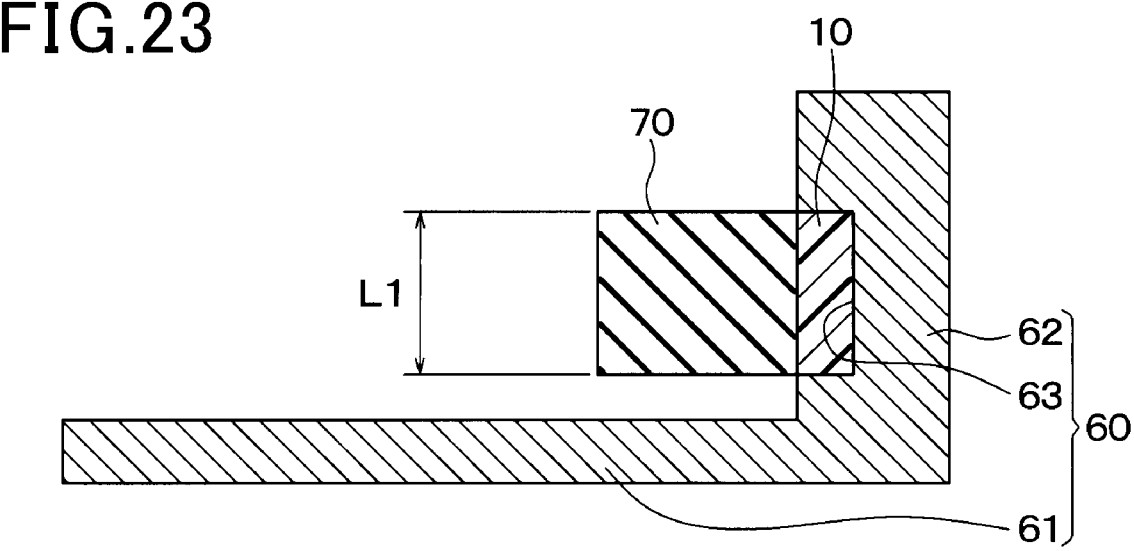
FIG. 23 is a cross-sectional view of a part of the support device to which the monitoring device is attached according to the eleventh embodiment.

The present embodiment will be described. As illustrated in FIG. 23, in the present embodiment, the fixed part 62 has a recessed part 63 on its face to which the elastic member 70 is attached, recessed toward the side opposite to the elastic member 70. The heat flux sensor 10 is placed in the recessed part 63 of the fixed part 62. The size of the heat flux sensor 10 is substantially the same as the size L1 of the elastic member 70. Such configuration of the monitoring device 1 also produces the same effects as those of the above-described first to tenth embodiments.

Twelfth Embodiment

Figure 24:
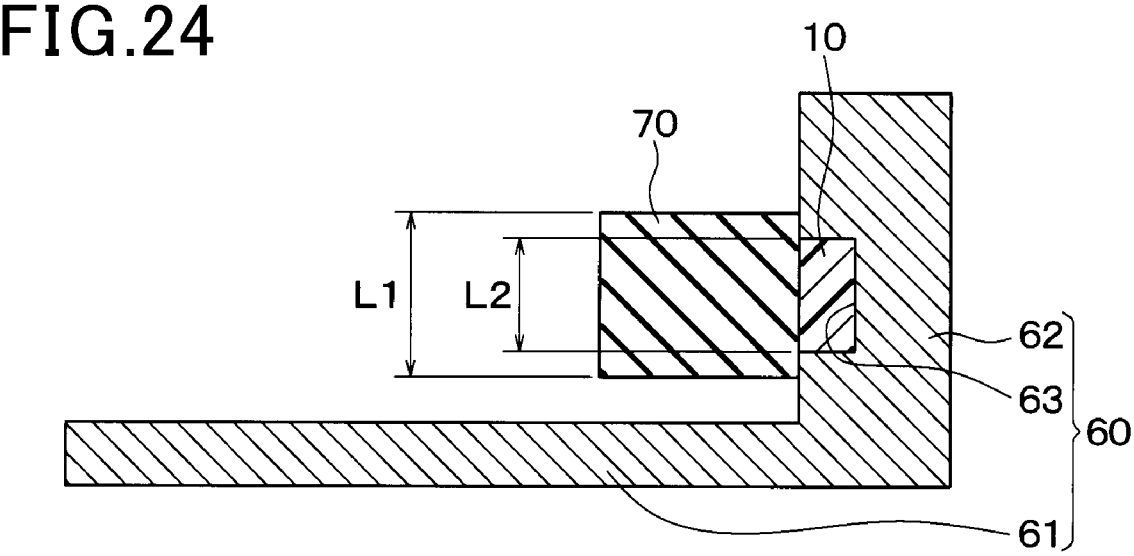
FIG. 24 is a cross-sectional view of a part of the support device to which the monitoring device is attached according to the twelfth embodiment.

The present embodiment will be described. As illustrated in FIG. 24, in the present embodiment, as with the eleventh embodiment, the fixed part 62 has a recessed part 63. The heat flux sensor 10 is placed in the recessed part 63 of the fixed part 62. The size L2 of the heat flux sensor 10 is smaller than the size L1 of the elastic member 70. Such configuration of the monitoring device 1 also produces the same effects as those of the above-described first to eleventh embodiments.

Thirteenth Embodiment

Figure 25:
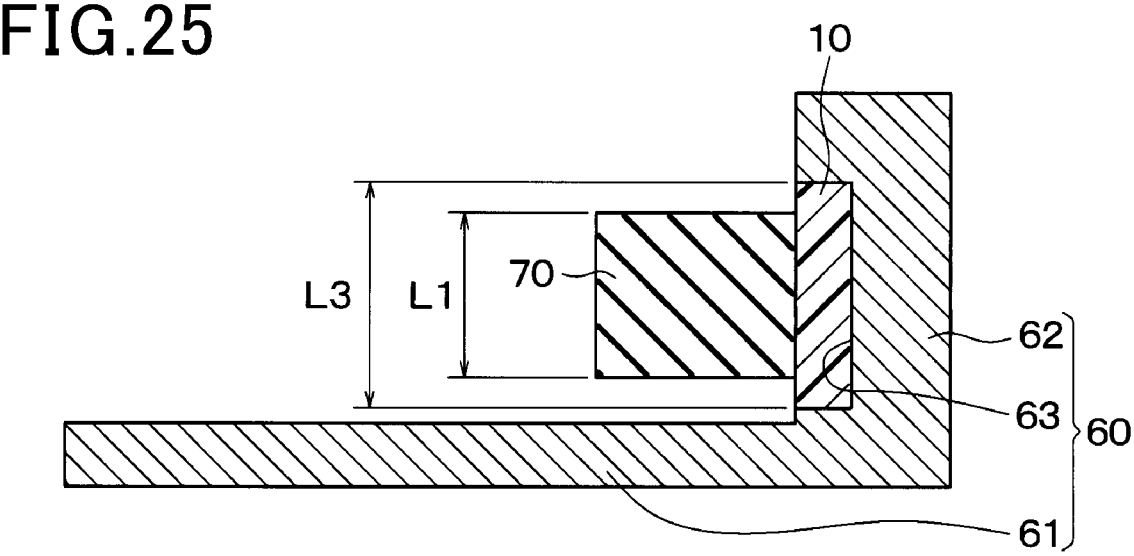
FIG. 25 is a cross-sectional view of a part of the support device to which the monitoring device is attached according to the thirteenth embodiment.

The present embodiment will be described. As illustrated in FIG. 25, in the present embodiment, as with the eleventh embodiment, the fixed part 62 has a recessed part 63. The heat flux sensor 10 is placed in the recessed part 63 of the fixed part 62. The size L3 of the heat flux sensor 10 is larger than the size L1 of the elastic member 70. Such configuration of the monitoring device 1 also produces the same effects as those of the above-described first to twelfth embodiments.

Fourteenth Embodiment

Figure 26:
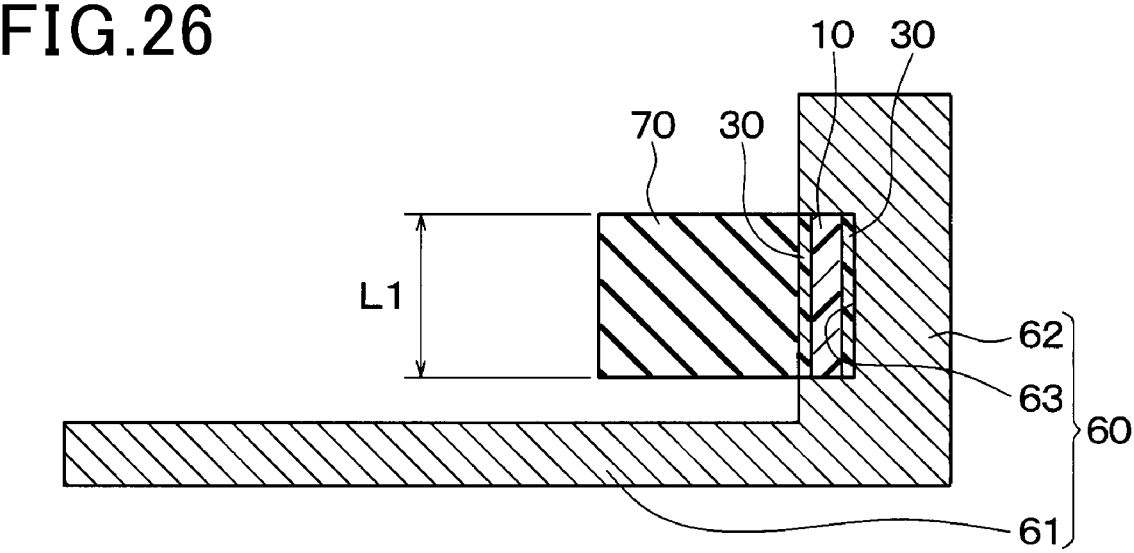
FIG. 26 is a cross-sectional view of a part of the support device to which the monitoring device is attached according to the fourteenth embodiment.

The present embodiment will be described. As illustrated in FIG. 26, in the present embodiment, as with the eleventh embodiment, the fixed part 62 has a recessed part 63. The heat flux sensor 10 is placed in the recessed part 63 of the fixed part 62. The size of the heat flux sensor 10 is substantially the same as the size L1 of the elastic member 70. The heat flux sensor 10 is attached to the recessed part 63 of the fixed part 62 and the elastic member 70 by an adhesive 30. Such configuration of the monitoring device 1 also produces the same effects as those of the above-described first to thirteenth embodiments.

Fifteenth Embodiment

Figure 27:
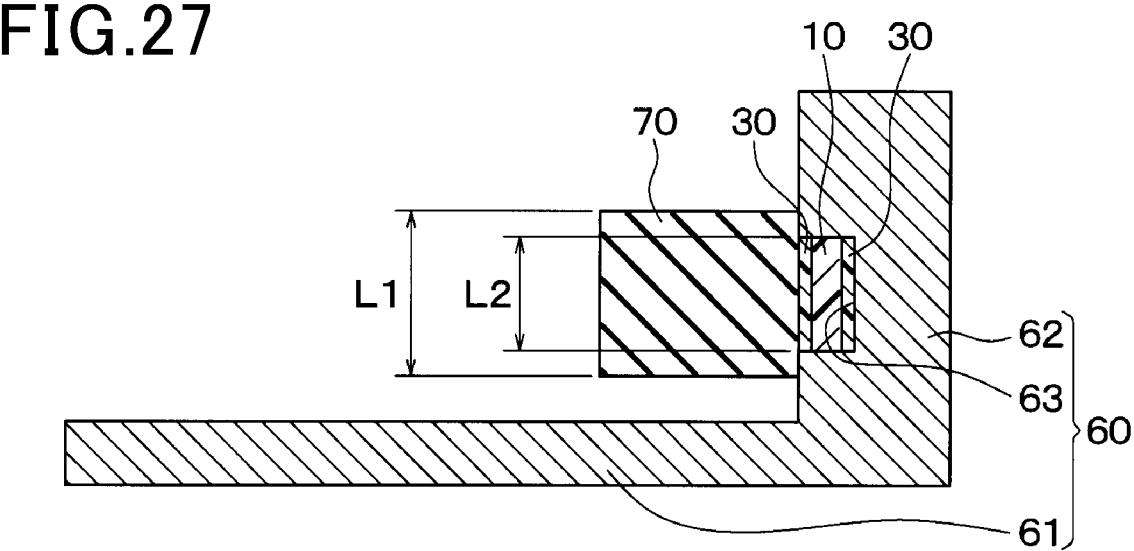
FIG. 27 is a cross-sectional view of a part of the support device to which the monitoring device is attached according to the fifteenth embodiment.

The present embodiment will be described. As illustrated in FIG. 27, in the present embodiment, as with the eleventh embodiment, the fixed part 62 has a recessed part 63. The heat flux sensor 10 is placed in the recessed part 63 of the fixed part 62. The size L2 of the heat flux sensor 10 is smaller than the size L1 of the elastic member 70. The heat flux sensor 10 is attached to the recessed part 63 of the fixed part 62 and the elastic member 70 by an adhesive 30. Such configuration of the monitoring device 1 also produces the same effects as those of the above-described first to fourteenth embodiments.

Sixteenth Embodiment

Figure 28:
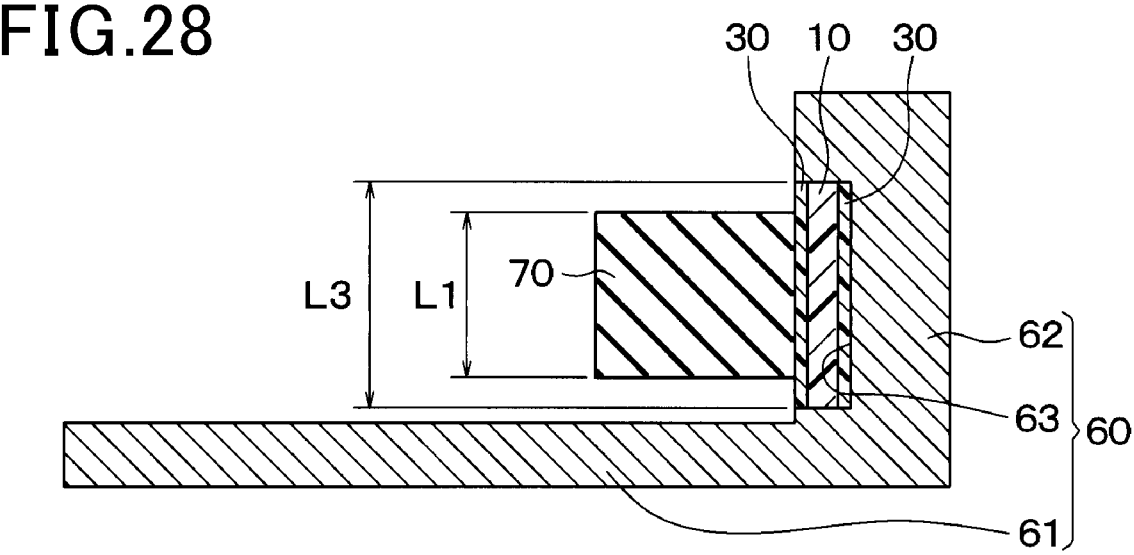
FIG. 28 is a cross-sectional view of a part of the support device to which the monitoring device is attached according to the sixteenth embodiment.

The present embodiment will be described. As illustrated in FIG. 28, in the present embodiment, as with the eleventh embodiment, the fixed part 62 has a recessed part 63. The heat flux sensor 10 is placed in the recessed part 63 of the fixed part 62. The size L3 of the heat flux sensor 10 is larger than the size L1 of the elastic member 70. The heat flux sensor 10 is attached to the recessed part 63 of the fixed part 62 and the elastic member 70 by an adhesive 30. Such configuration of the monitoring device 1 also produces the same effects as those of the above-described first to fifteenth embodiments.

Seventeenth Embodiment

Figure 29:
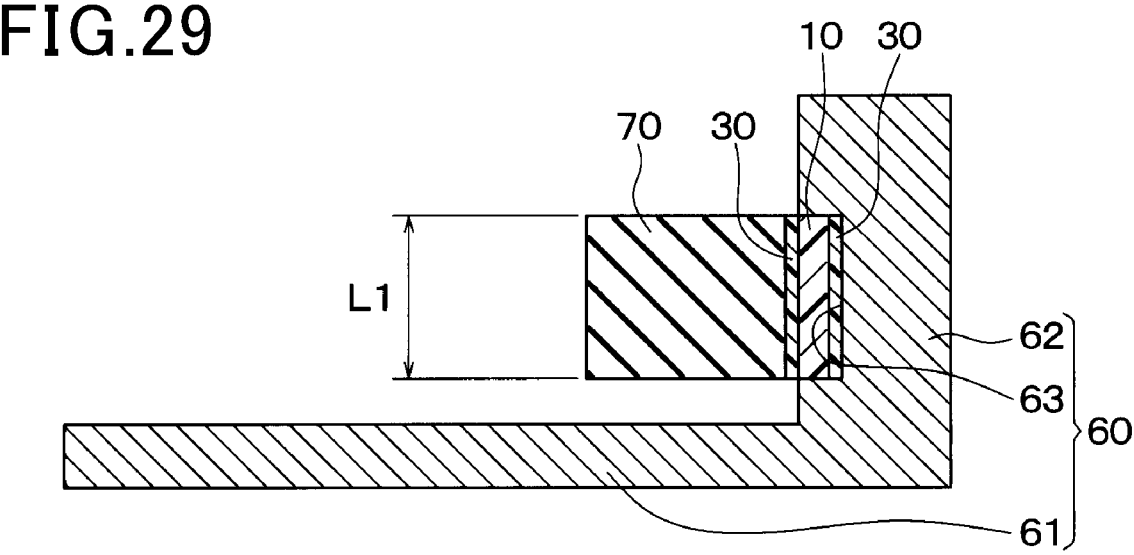
FIG. 29 is a cross-sectional view of a part of the support device to which the monitoring device is attached according to the seventeenth embodiment.

The present embodiment will be described. As illustrated in FIG. 29, in the present embodiment, as with the eleventh embodiment, the fixed part 62 has a recessed part 63. The heat flux sensor 10 is placed in the recessed part 63 of the fixed part 62. The heat flux sensor 10 is attached to the recessed part 63 of the fixed part 62 and the elastic member 70 by an adhesive 30. The adhesive 30 for bonding the heat flux sensor 10 and the elastic member 70 protrudes from the recessed part 63 of the fixed part 62 to the elastic member 70 side. Such configuration of the monitoring device 1 also produces the same effects as those of the above-described first to sixteenth embodiments.

Other Embodiments

The technique disclosed herein is not limited to the above embodiments. The technique of the present disclosure may be appropriately altered within the scope of the claims. Specific examples are as follows.

(1) In the above-described embodiments, an example has been described where the piston rod 53 of the air cylinder 52 is the movable member 51. However, this is not limiting. In other embodiments, the movable member 51 corresponds to various members such as a linear motor or a hydraulic cylinder.

(2) In the above-described embodiments, an example has been described where the elastic member 70 is made of rubber. However, this is not limiting. The elastic member 70 needs not to be made of rubber and non-limiting examples of its material include metal and resin. In other embodiments, the elastic member 70 corresponds to various members such as an elastomer such as silicone rubber or urethane rubber, or a coil spring, as long as it is a member capable of storing internal energy by elastic deformation.

(3) In the above-described embodiments, an example has been described where the elastic member 70 and the heat flux sensor 10 are configured as separate members. However, this is not limiting. In other embodiments, for example, the front side protection member 110 or the rear side protection member 120 of the heat flux sensor 10 may serve as the elastic member 70 that generates heat by elastic deformation. That is, the elastic member 70 and the heat flux sensor 10 may be formed integrally.

(4) In the above embodiments, an example has been described where the elastic member 70 is compressed when the support device 50 supports the target object 2. However, this is not limiting. In other embodiments, the elastic member 70 may be elastically deformed in another way, for example, stretched or bent when the support device 50 supports the target object 2.

(5) In the above embodiments, a heat flux sensor 10 as follows has been described as an example of the heat flux sensor 10 that outputs a signal corresponding to the heat flux flowing between the elastic member 70 and the outside. Specifically, the heat flux sensor 10 provided between the fixed member 60 and the elastic member 70, and the heat flux sensor 10 provided between the movable member 51 and the elastic member 70 have been described as examples, but this is not limiting. In other embodiments, the heat flux flowing between the elastic member 70 and the outside (outside air) may be detected by a heat flux sensor 10 attached to the outer wall of the elastic member 70.

(6) The above described embodiments may be combined as appropriate unless they are irrelevant to each other and obviously cannot be combined. Further, elements composing the above described embodiments are not necessarily required unless it is explicitly described that the element is essential or the element is obviously considered to be essential in principle.

CONCLUSION

According to a first aspect shown in a part or all of the above embodiments, a support device which is one mode of the technique of the present disclosure comprises a plurality of support members arranged so that a target object is placed between the support members, and an elastic member is provided to at least one of the support members. The monitoring device which is one mode of the technique of the present disclosure monitors the support state of the target object supported by the support device. The monitoring device includes a heat flux sensor and a detection part. When the target object is supported between the support members due to force applied by at least one of the support members, the heat flux sensor outputs a signal corresponding to the heat flux flowing between the elastic member, which is elastically deformed by the load applied from the support member, and the outside. Based on the signal output by the heat flux sensor, the detection part detects the support state of the target object supported by the support members, or the size of the target object.

According to a second aspect, when the output of the heat flux sensor is larger than a predetermined threshold, the detection part determines that the target object is supported at the correct position by the support members. When the output of the heat flux sensor is smaller than the predetermined threshold, the detection part determines that the target object is not supported at the correct position by the support members or the size of the target object is smaller than the permitted size.

The detection part stores a threshold obtained through experiments or the like in a storage device (predetermined storage area). As a result, the monitoring device can determine whether or not the target object is being supported at the correct position based on the signal output by the heat flux sensor. Alternatively, the monitoring device can determine whether or not the size of the target object is smaller than the permitted size.

According to a third aspect, the predetermined threshold is a first threshold. The detection part stores not only the first threshold but also a second threshold that is larger than the first threshold. When the output of the heat flux sensor is greater than the second threshold, the detection part determines that the size of the target object is larger than the permitted size.

When the size of the target object is larger than the permitted size, the amount of compression of the elastic member increases. Thus, the amount of heating of the elastic member increases, and accordingly the output of the heat flux sensor also increases. In view of this, the detection part stores a second threshold obtained through experiments or the like in a storage device (predetermined storage area). As a result, the monitoring device can determine whether or not the size of target object is larger than the permitted size based on the signal output by the heat flux sensor.

According to a fourth aspect, the heat flux sensor is provided between the elastic member and the support member.

Thus, the heat flow flows well through the elastic member, the heat flux sensor, and the support member. Accordingly, the technique of the present disclosure can improve the detection accuracy of the heat flux sensor.

For example, it is assumed that the heat flux sensor is attached to the face of the elastic member on the open air side. In this case, the air around the heat flux sensor stagnates, and the heat flow does not flow well through the heat flux sensor. In contrast, according to the technique of the present disclosure, since the heat flux sensor is provided between the elastic member and the support member, it is possible to make the heat flow well.

Further, according to the technique of the present disclosure, it is possible to prevent the heat flux sensor from detaching from the elastic member, as compared with the case where the heat flux sensor is attached to the face of the elastic member on the open air side.

According to a fifth aspect, the support members comprise a fixed member and a movable member placed so as to sandwich the target object with the fixed member. The elastic member is provided on the target object side of the fixed member. The heat flux sensor is provided between the elastic member and the fixed member.

For example, it is assumed that the heat flux sensor is attached to the movable member. In this case, the movement of the movable member generates frictional heat. As a result, the heat flux resulting from the frictional heat affects the output of the heat flux sensor. In contrast, according to the technique of the present disclosure, since the heat flux sensor is provided between the elastic member and the fixed member, no frictional heat is generated and the output of the heat flux sensor is not affected.

What is claimed is:

1. A monitoring device for monitoring a support state of a target object supported by a support device or for determining whether a size of the target object is a permitted size, the support device comprising a plurality of support members arranged so that the target object is placed between the support members, and an elastic member is provided to at least one of the support members, the monitoring device comprising:
    a heat flux sensor which, when the target object is supported between the support members due to force applied by at least one of the support members, outputs a signal corresponding to heat flux flowing from the elastic member, which is elastically deformed by a load applied due to the force applied by the at least one of the support members; and
    a detection part which detects the support state of the target object supported by the support members or the size of the target object based on the signal output by the heat flux sensor, wherein the support state is indicative of whether the target object is being supported at a correct position.

2. The monitoring device according to claim 1, wherein the detection part
    determines that the target object is supported at the correct position by the support members when the output of the heat flux sensor is larger than a predetermined threshold, and
    determines that the target object is not supported at the correct position by the support members or the size of the target object is smaller than a permitted size when the output of the heat flux sensor is smaller than the predetermined threshold.

3. The monitoring device according to claim 2, wherein the predetermined threshold is a first threshold, and the detection part
    stores not only the first threshold but also a second threshold that is larger than the first threshold, and
    determines that the size of the target object is larger than the permitted size when the output of the heat flux sensor is greater than the second threshold.

4. The monitoring device according to claim 1, wherein the heat flux sensor is provided between the elastic member and the support member, and outputs a signal corresponding to heat flux flowing between the elastic member and the support member.

5. The monitoring device according to claim 1, wherein the support members comprise a fixed member and a movable member positioned so as to sandwich the target object with the fixed member and capable of moving relative to the fixed member,
    the elastic member is provided on the target object side of the fixed member, and the heat flux sensor is provided between the elastic member and the fixed member.

* * * * *